US010649439B2

United States Patent
Wang et al.

(10) Patent No.: US 10,649,439 B2
(45) Date of Patent: May 12, 2020

(54) ON-LINE MONITORING METHOD AND SYSTEM FOR THREE-DIMENSIONAL PRINTING

(71) Applicant: Hangzhou Regenovo Biotechnology Co., Ltd., Hangzhou, Zhejiang (CN)

(72) Inventors: Ling Wang, Zhejiang (CN); Ming'en Xu, Zhejiang (CN); Peijian Si, Zhejiang (CN); Xuecong Lai, Zhejiang (CN)

(73) Assignee: Hangzhou Regenovo Biotechnology Co., Ltd., Hangzhou (CN)

( * ) Notice: Subject to any disclaimer, the term of this patent is extended or adjusted under 35 U.S.C. 154(b) by 55 days.

(21) Appl. No.: 16/016,650

(22) Filed: Jun. 24, 2018

(65) Prior Publication Data

US 2019/0086899 A1 Mar. 21, 2019

(30) Foreign Application Priority Data

Sep. 21, 2017 (CN) .......................... 2017 1 0857809
Nov. 16, 2017 (CN) .......................... 2017 1 1141189
Mar. 22, 2018 (CN) .......................... 2018 1 0237498

(51) Int. Cl.
*G05B 19/00* (2006.01)
*G05B 19/4099* (2006.01)
(Continued)

(52) U.S. Cl.
CPC ........ *G05B 19/4099* (2013.01); *B29C 64/393* (2017.08); *B33Y 50/02* (2014.12);
(Continued)

(58) Field of Classification Search
CPC ...... G05B 19/4099; G05B 2219/49007; B33Y 50/02; B33Y 30/00; B33Y 10/00;
(Continued)

(56) References Cited

U.S. PATENT DOCUMENTS

| 5,877,798 | A | * | 3/1999 | Clarke | .................... | B41J 2/471 347/250 |
| 6,456,323 | B1 | * | 9/2002 | Mancuso | .............. | G06T 3/4038 348/218.1 |

(Continued)

FOREIGN PATENT DOCUMENTS

| CN | 101520319 | * | 9/2009 | ............. | G01B 11/24 |
| CN | 103171151 | * | 6/2013 | ............. | B29C 67/00 |

(Continued)

OTHER PUBLICATIONS

Izadi, S., Kim, D., Hilliges, O., Molyneaux, D., Newcombe, R., Kohli, P., Shotton, J., Hodges, S., Freeman, D., Davison, A., & Fitzgibbon, A. (2011). KinectFusion: Real-time 3D reconstruction and interaction using a moving depth camera, UIST'11, Oct. 16-19, 1-10. (Year: 2011).*

(Continued)

*Primary Examiner* — Michael D Masinick
(74) *Attorney, Agent, or Firm* — Leydig, Voit & Mayer, Ltd.

(57) ABSTRACT

Provided are a three-dimensional printing on-line monitoring method and system, relating to the technical field of three-dimensional printing, so as to solve the technical problem that the existing three-dimensional printing on-line monitoring systems are limited in imaging volume and cannot realize full-longitudinal-depth imaging. In the three-dimensional printing on-line monitoring method, full-longitudinal-depth imaging monitoring of the whole printing process is achieved by longitudinal-depth segmented scanning of a printing solidified layer and based on a longitudinal automatic splicing algorithm, and synchronous micro-tomography imaging on-line monitoring of the printing is achieved by guiding printing parameter optimization and control of a next depth-increased segment by using in real time a result feedback of the longitudinal-depth segmented (Continued)

being scanned; and at the same time of completing the manufacturing of the printed product, a three-dimensional high-resolution global image of an internal structure of the printed product is acquired, thereby completing quality control.

16 Claims, 14 Drawing Sheets

(51) Int. Cl.
```
G06T 7/55      (2017.01)
G06T 15/08     (2011.01)
B33Y 50/02     (2015.01)
B29C 64/393    (2017.01)
B33Y 30/00     (2015.01)
B33Y 10/00     (2015.01)
```
(52) U.S. Cl.
CPC ............... *G06T 7/55* (2017.01); *G06T 15/08* (2013.01); *B33Y 10/00* (2014.12); *B33Y 30/00* (2014.12); *G05B 2219/49007* (2013.01); *G06T 2207/10028* (2013.01); *G06T 2207/30144* (2013.01)

(58) Field of Classification Search
CPC . G06T 15/08; G06T 7/55; G06T 2207/30144; G06T 2207/10028; B29C 64/393
See application file for complete search history.

(56) References Cited

U.S. PATENT DOCUMENTS

| | | | | |
|---|---|---|---|---|
| 7,589,849 B2 * | 9/2009 | Carney | ............... | G06F 3/1204 358/1.14 |
| 7,768,642 B2 * | 8/2010 | Oskotsky | ........... | G02B 17/0812 356/328 |
| 10,265,911 B1 * | 4/2019 | Capri | .................... | G06T 7/001 |
| 2003/0080440 A1 * | 5/2003 | Miks | ..................... | H01L 23/544 257/787 |
| 2008/0273063 A1 * | 11/2008 | Wouters | ................ | B41J 2/1707 347/85 |
| 2011/0106001 A1 * | 5/2011 | Ott | ...................... | A61M 13/003 604/24 |
| 2013/0095302 A1 * | 4/2013 | Pettis | ..................... | B29C 64/20 428/195.1 |
| 2014/0198893 A1 * | 7/2014 | Badawi | ................ | G01N 23/046 378/9 |
| 2015/0125657 A1 * | 5/2015 | Knestel | ............ | G01M 17/0074 428/141 |
| 2015/0273583 A1 * | 10/2015 | Bumgardner | ......... | B22F 3/1055 419/53 |
| 2015/0331402 A1 * | 11/2015 | Lin | ..................... | G06F 17/5009 700/119 |
| 2016/0236414 A1 * | 8/2016 | Reese | ................ | G05B 19/4099 |
| 2016/0283833 A1 * | 9/2016 | Peek | ....................... | B29C 67/00 |
| 2017/0066194 A1 * | 3/2017 | Bromer | .................. | B33Y 30/00 |
| 2017/0120337 A1 * | 5/2017 | Kanko | .................. | H01L 23/544 257/787 |
| 2017/0246809 A1 * | 8/2017 | Starr | ...................... | B33Y 30/00 |
| 2019/0070786 A1 * | 3/2019 | Lewis | ................... | B29O 67/00 |

FOREIGN PATENT DOCUMENTS

| | | | | |
|---|---|---|---|---|
| CN | 104669619 | * | 6/2015 | ............. B29C 67/00 |
| CN | 207301829 | * | 5/2018 | ............. A61L 9/16 |
| KR | 20160089805 | * | 7/2016 | ............. B25J 11/00 |
| KR | 20180096262 | * | 8/2018 | ............. A63H 9/00 |
| KR | 20180126186 | * | 11/2018 | ............. B29B 11/14 |
| WO | WO2019012886 | * | 1/2019 | ........... B29C 64/118 |

OTHER PUBLICATIONS

Faes, M., Vogeler, F., Coppens, K., Valkenaers, H., Ferraris, E., Abbeloos, W., & Goedeme, T. (2014). Process monitoring of extrusion based 3D printing via laser scanning, Conference Proceedings PMI 6, 363-367. (Year: 2014).*

Ceruti, A., Liverani, A., & Bombardi, T. (2017). Augmented vision and interactive monitoring in 3D printing process, International Journal on Interactive Design and Manufacturing, 11, 385-395. (online publication Sep. 3, 2016) (Year: 2016).*

* cited by examiner

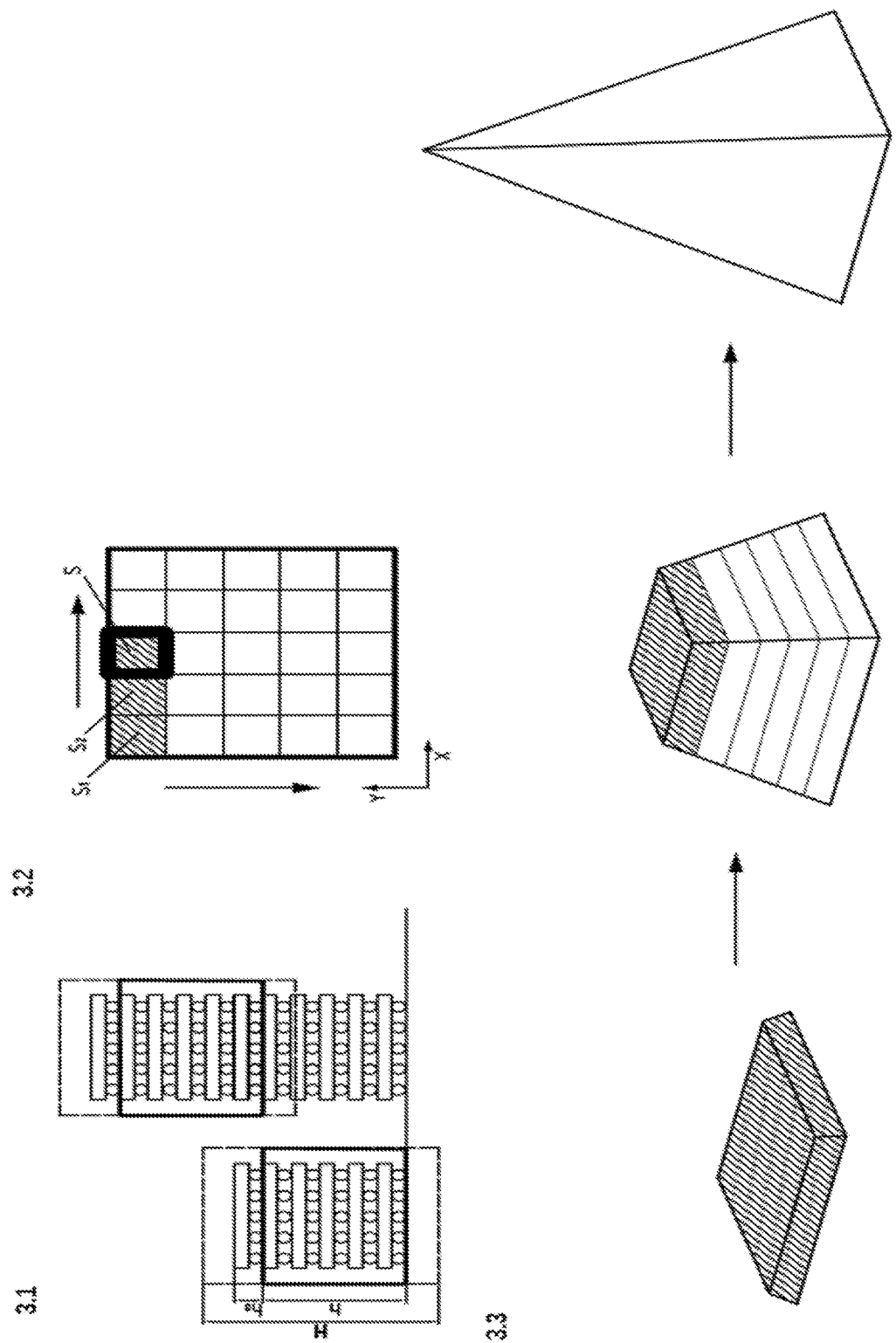

ON-LINE MONITORING METHOD AND SYSTEM FOR THREE-DIMENSIONAL PRINTING

CROSS-REFERENCE TO RELATED APPLICATIONS

The present application claims priority to Chinese patent application no. 201710857809.X, filed with the Chinese Patent Office on Sep. 21, 2017 and entitled "Three-dimensional Printing synchronous Micro-tomography On-line Monitoring Method and System", to Chinese patent application No. 201711141189.6, filed with the Chinese Patent Office on Nov. 16, 2017 and entitled "Method and Apparatus of Real-time Monitoring Three-dimensional Printing", and to Chinese patent application No. 201810237498.1, filed with the Chinese Patent Office on Mar. 22, 2018 and entitled "Method and Apparatus of Real-time Monitoring Three-dimensional Printing", the entire contents of which are incorporated herein by reference.

BACKGROUND OF THE INVENTION

Technical Field

The present disclosure relates to the technical field of three-dimensional printing, and particularly to a three-dimensional printing on-line monitoring method and system.

Background Art

Three-dimensional printing is based on the rapid prototyping and laminated object manufacturing principle and is capable of locating and assembling materials/cells according to a design to form a three-dimensional structure, which provides a new technology for the manufacturing of non-homogeneous and complicated industrial parts, consumables, medical instruments and tissues and organs. However, quality conformity is crucial to popularization and application of the three-dimensional printing technology and is particularly important in the medical field. How to ensure the printing quality conformity in a printing process is a challenge for the current three-dimensional printing technology.

SUMMARY OF THE INVENTION

An object of the present disclosure is to provide an on-line monitoring method and system for three-dimensional printing, which improve the quality stability of a printed object in a three-dimensional printing process to a great extent.

A first aspect of embodiments of the present disclosure provides an on-line monitoring method for three-dimensional printing, using a printing parameter-controllable three-dimensional printing device and a three-dimensional high-precision nondestructive imaging system, wherein the printing parameter-controllable three-dimensional printing device comprises: a PC (personal computer), a central control module, a print platform, printhead(s) (printer spray head), an X/Y/Z three-axis mobile module and a printhead mounting arm, and the three-dimensional high-precision nondestructive imaging system comprises: a three-dimensional high-precision nondestructive imaging host and a sample detection probe, the three-dimensional printing on-line monitoring method comprises:

Step 1: integrating the three-dimensional high-precision nondestructive imaging system into the printing parameter-controllable three-dimensional printing device to real-time on-line monitor three-dimensional printing (three-dimensional printing synchronous on-line monitoring) and incorporate multi-field-of-view collaborative visual images with each other, to achieve rapid positioning of transverse range for monitoring a surface of a printed object in a printing process;

Step 2: achieving full-longitudinal-depth imaging monitoring of the whole printing process by longitudinal-depth segmented scanning of a printing solidified layer, based on a longitudinal automatic splicing algorithm, and guiding printing parameter optimization and control of a next depth-increased segment by using in real time a result feedback of the longitudinal-depth segmented scanning, so as to perform synchronous micro-tomography imaging on-line monitoring of the printing;

Step 3: acquiring a three-dimensional high-resolution global image of an internal structure of a printed product, when completing the manufacturing of the printed product.

According to a first possible implementation mode of the first aspect, Step 2 comprises:

the PC controlling the three-dimensional printing device to perform transverse scanning and longitudinal-depth segmented scanning on a currently printed body, wherein the printed object is segmented according to an imaging depth H of the three-dimensional high-precision nondestructive imaging host and an effective imaging depth h of the printed object, and one segment is scanned in longitudinal depth at a time;

acquiring in real time monitoring information of the printed object in a current printing process; and optimizing in real time the printing process control through the monitoring information.

According to a second possible implementation mode of the first aspect, scanning images of the printed object are acquired in each transverse scanning and each longitudinal-depth segmented scanning in the printing monitoring process, until the printing is completed.

The method further comprises: splicing and longitudinally superimposing all the acquired scanning images to obtain a three-dimensional high-resolution global image of the printed object; and storing the obtained three-dimensional high-resolution global image of the printed object.

A second aspect of embodiments of the present disclosure provides a three-dimensional printing on-line monitoring system, comprising: a printing parameter-controllable three-dimensional printing device and a three-dimensional high-precision nondestructive imaging system, wherein the printing parameter-controllable three-dimensional printing device comprises: a PC, a central control module, a print platform, printhead(s), an X/Y/Z three-axis mobile module and a printhead mounting arm, and the three-dimensional high-precision nondestructive imaging system comprises: a three-dimensional high-precision nondestructive imaging host and a sample detection probe;

the PC is used for editing and analyzing a three-dimensional model, editing printing parameters and detection parameters according to requirements, sending a processing instruction, and on-line monitoring in real time the structure of the currently printed body and errors resulting from accumulation and overlaying-adhesion of one or more layers of a printing material;

the central control module is used for receiving the processing instruction and controlling the printhead, the X/Y/Z three-axis mobile module and the printhead mounting arm;

the printhead can be partitioned according to the material of the printed object and different process positions, the temperature of each partition can be adjusted with a temperature control function. The partitioned areas include: a storage area, a transition area, an extrusion area and a forming area. The sample detection probe is mounted on the printhead mounting arm and is configured to share a motion driving and controlling module with the printhead mounting arm;

the three-dimensional high-precision nondestructive imaging host, which is connected with the PC, is used for transmitting data and controlling the sample detection probe to complete scanning and imaging; and the sample detection probe is configured in such a way that the sample detection probe moves, in cooperation with the print platform or the printhead mounting arm, along an X axis/Y axis/Z axis, to complete one transverse area scanning and one longitudinal-depth scanning for the printed object, and at the moment, the sample detection probe completes one detection, the printhead continues printing, and when a certain printing thickness is reached, detection is performed again, this process is repeated until the printing is completed; thereafter, the PC reconstructs the detected data into a three-dimensional high-resolution global image, thereby achieving full-longitudinal-depth imaging.

According to a first possible implementation mode of the second aspect, for the three-dimensional high-precision nondestructive imaging host, one of an optical coherence tomography (OCT) host, a multiphoton microscopy (MPM) host, a second harmonic generation (SHG) host, a confocal microscopy (CM) host, an ultrasound imaging host and a photoacoustic microscopy (PAM) host or a combination of more than one of them is used.

In the above, the OCT technology can be applied to a time domain OCT system, a swept-source OCT system, a spectral-domain OCT system, a full-field OCT system, a fibre-optical OCT system, a free-space OCT system, and variants of such technology, e.g., doppler OCT, polarization OCT, optical coherence phase microscopy (OCPM), etc., or a commercial OCT system, e.g., the Telesto® series and GANYMEDE-II® series of Thorlabs Corp., IVS-1000/2000 of Santec Corp., etc. The MPM technology can be two-photon fluorescence microscopy imaging technology, three-photon fluorescence microscopy imaging technology, multi-focal-point multiphoton microscopy technology or commercial multiphoton fluorescence microscopy imaging technology, e.g., the FVMPE-RS system of Olympus Corp., Bergamo-II series of Thorlabs Corp., etc. The CM technology can be applied to a laser scanning confocal spectral imaging system, a spinning-disk confocal microscope system, a programmable array microscope system or a commercial CM system, e.g., Zeiss LSM800® of Zeiss Corp., LEXT-OLS4100 of Olympus Corp., etc.

It should be mentioned herein that the embodiments of the present disclosure are not limited to the high-precision nondestructive imaging technology described above, instead, all of the three-dimensional high-precision nondestructive imaging technologies with certain imaging depth should fall within the protection scope.

According to a second possible implementation mode of the second aspect, the sample detection probe comprises: a machine vision imaging module and a micro-tomography detection module, wherein the machine vision imaging module is used for field-of-view monitoring, and the micro-tomography detection module is used for small-range high-precision image acquisition.

In a third possible implementation mode of the second aspect, the printing parameters and the detection parameters edited by the PC include: an imaging depth H of the three-dimensional high-precision nondestructive imaging host, an effective imaging depth h, a thickness h0 of the top that cannot be cured within a short time after printing, an initially detected printing thickness h+h0 (h+h0≤H), and a subsequently detected printing thickness h, wherein the value of the effective imaging depth h, the value of the subsequently detected printing thickness h and the value of h in the initially detected printing thickness are the same.

A third aspect of embodiments of the present disclosure provides a three-dimensional printing on-line monitoring method, comprising: acquiring monitoring information of a printer in a printing process, and comparing the monitoring information with a preset parameter to determine whether the monitoring information conforms to the preset parameter, wherein if yes, the printing operation is continued according to input modeling parameters; and if not, a matching judgment is performed on the reason why the monitoring information does not conform to the preset parameter, according to a comparison result between the monitoring information and the preset parameter, then an optimization adjustment is performed on the process control of the printer, and the printing operation is continued.

The modeling parameters refer to hierarchical path parameters of a model. According to a first possible implementation mode of the third aspect, the method further comprises:

judging, when the monitoring information conforms to the preset parameter, whether the entire printing operation of the current layer has been completed, wherein if yes, the printing operation is stopped; and if not, the printing operation is continued according to the modeling parameters in the printer.

In a second possible implementation mode of the third aspect, the monitoring information includes forming environmental information, forming parameter and formed structure; and the forming environmental information, the forming parameter and the formed structure are collected to form the monitoring information for invoking and comparison matching.

In a third possible implementation mode of the third aspect, the preset parameters comprise environmental parameters, printing parameters and model designing parameters that serve as comparison standards of the monitoring information;

the environmental parameters comprise temperature, humidity, carbon dioxide concentration and air cleanliness of a forming environment;

the printing parameters comprise printing material properties, a printhead model and inner and outer diameters of the needle, a printhead temperature, illumination intensity, focusing spot diameter of the laser, power of the laser, exposure time, exposure frequency, filament-discharge pressure, an X/Y-direction printing speed, a Z-direction printing speed, pre-filament-discharge time, later-filament-discharge time, turning delay time, callback time, a layer height, and a filament-discharge interval; and the model designing parameters comprise structural morphology parameters of each layer, and three-dimensional overall internal and external structure parameters.

In a fourth possible implementation mode of the third aspect, the step of matching judgment comprises:

comparing the forming environmental information with the environmental parameters, and judging whether the monitoring information conforms to the environmental parameters, wherein if not, the optimization adjustment is performed on the printing process control;

comparing the forming parameter with the printing parameters, and judging whether the forming parameter conforms to the printing parameters, wherein if not, the optimization adjustment is performed on the printing process control; and comparing the formed structure with the model designing parameters, wherein the comparing comprises comparing printing errors of the current layer and three-dimensional internal structure information within the corresponding detection range of the current layer; and judging whether the formed structure conforms to the model designing parameters, wherein if not, the optimization adjustment is performed on the printing process control.

In a fifth possible implementation mode of the third aspect, the step of the optimization adjustment comprises correcting the modeling parameters in the printer, correcting the output of the printer and/or correcting the working environment of the printer.

According to a fourth aspect of embodiments of the present disclosure, there is provided a three-dimensional printing real-time monitoring apparatus, comprising an environment control component for controlling and adjusting the working environment of a printer;

a printing assembly provided in the environment control component and used for executing the printing of a product according to modeling parameters stored in the printer;

a monitoring assembly provided in the printing assembly and used for acquiring monitoring information of a layer under printing (currently printed layer) and monitoring information of a printed three-dimensional object;

a processing control module for storing the preset parameters, receiving the monitoring information, performing comparison and analysis on the monitoring information and the preset parameters, and controlling the environment control component and the printing assembly and/or performing optimization and correction on the modeling parameters, when the monitoring information does not conform to the preset parameters, so that the printed product conforms to the preset parameters.

According to a first possible implementation mode of the fourth aspect, the environment control component comprises an environment control module and a sterile operation desk;

the environment control module is connected with the processing control module;

the environment control module can regulate and control the temperature, the humidity and the carbon dioxide concentration in the working environment of the printer; moreover, the environment control module is further provided with an air filtering device for controlling the particle content in the air and completing ultraviolet sterilization and/or ozone sterilization; and the sterile operation desk is used for bearing the printing assembly, and providing, in cooperation with the environment control module, an environment parameter-controllable, sterile and dust-free operation environment for the three-dimensional printing apparatus.

According to a second possible implementation mode of the fourth aspect, the printing assembly comprises:

a forming platform connected with the environment control component and used for bearing a printed product and capable of adjusting its own temperature;

a printing operation module that is used for printing a product and is capable of replacing the printhead type thereof and adjusting the forming parameter settings of the printhead and the printing assembly;

a printing movement module for driving the printing operation module to move in the three directions of X, Y and Z in the environment control component; and a printing control module connected with the processing control module and used for controlling the forming platform, the printing operation module and the printing movement module to complete the printing.

According to a third possible implementation mode of the fourth aspect, the monitoring assembly comprises:

a high-precision nondestructive monitoring module for monitoring spectral information of a printing material and internal and external structural forms of a printed product;

a machine vision module for monitoring the product printing forming process and the current layer information of the printed product;

an environment monitoring module for monitoring the printing working environment; and a monitoring control module connected with the processing control module and used for collecting information acquired by monitoring of the high-precision nondestructive monitoring module, the machine vision module and/or the environment monitoring module to form monitoring information and uploading the monitoring information to the processing control module.

In a fourth possible implementation mode of the fourth aspect, the monitoring assembly comprises a nondestructive monitoring apparatus based on the OCT technology and the Fourier transform infrared spectroscopy (FTIR), a machine vision apparatus based on high-resolution image acquisition and an environment monitoring module based on a distributed sensor; and a standard infrared spectrum library for comparison with the spectrums of the printing material collected by the nondestructive monitoring apparatus is pre-stored in the processing control module, for monitoring the conditions of matching and state of the printing material.

In the three-dimensional printing on-line monitoring method and system provided by the embodiments of the present disclosure, online monitoring is achieved by monitoring in real time the printing process, combining the preset printing parameters, adjusting and optimizing printing in real time and achieving the three-dimensional printing parameter optimization and control, so as to achieve high-precision full-longitudinal-depth three-dimensional monitoring and feedback control in the printing process of industrial, consumption or biological three-dimensional products and other three-dimensional products, thereby effectively improving printing quality conformity.

BRIEF DESCRIPTION OF THE DRAWINGS

The drawings, which constitute a part of the present disclosure, are provided for further understanding of the present disclosure. The exemplary embodiments of the present disclosure and the description thereof are used to explain the present disclosure, rather than constitute an improper limitation on the present disclosure. In the drawings:

FIG. 1-2 is a schematic structural diagram of a three-dimensional printing apparatus according to embodiments of the present disclosure;

FIG. 1-3 is a schematic structural block diagram of another three-dimensional printing apparatus according to embodiments of the present disclosure;

FIG. 2 is a schematic flow chart of full-longitudinal-depth imaging monitoring in a three-dimensional printing on-line monitoring method according to embodiments of the present disclosure;

FIG. 3 is a schematic flow chart of longitudinal-depth segmented scanning in a three-dimensional printing on-line monitoring method according to an embodiment of the present disclosure;

FIG. 5-1 is a frame diagram of a three-dimensional printing real-time monitoring method according to embodiments of the present disclosure;

FIG. 5-2 is a frame diagram of another three-dimensional printing real-time monitoring method according to embodiments of the present disclosure;

FIG. 6-1 is a flow chart of a three-dimensional printing real-time monitoring method according to embodiments of the present disclosure;

FIG. 6-2 is a flow chart of another three-dimensional printing real-time monitoring method according to embodiments of the present disclosure;

FIG. 7-1 is a frame diagram, showing monitoring information in a three-dimensional printing real-time monitoring method according to embodiments of the present disclosure;

FIG. 7-2 is a frame diagram, showing monitoring information in another three-dimensional printing real-time monitoring method according to embodiments of the present disclosure;

Figure 1:
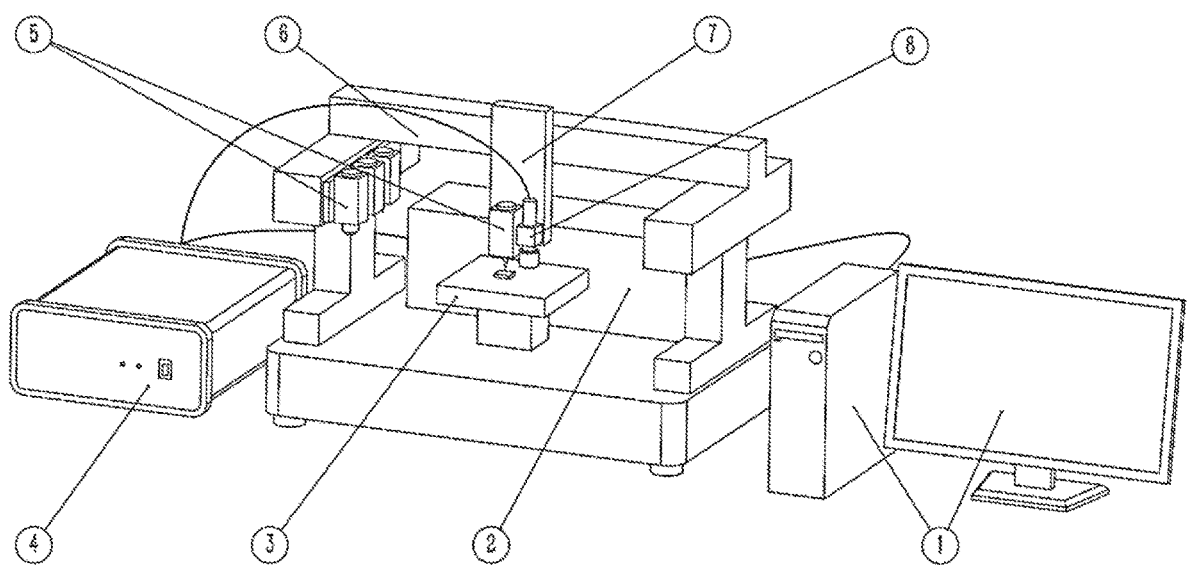
FIG. 1-1 is a schematic structural diagram of a three-dimensional printing on-line monitoring system according to embodiments of the present disclosure.

In the drawings: 1—PC; 2—central control module; 3—print platform; 4—three—dimensional high—precision nondestructive imaging host; 5—printhead; 6—X/Y/Z three—axis mobile module; 7—printhead mounting arm; and 8—sample detection probe; 100—environment control component; 110—environment control module; 120—sterile operation desk; 200—printing assembly; 210—forming platform; 220—printing operation module; 230—printing movement module; 240—printing control module; 300—monitoring assembly; 310—high-precision nondestructive monitoring module; 320—machine vision module; 330—environment monitoring module; 340—monitoring control module; 400—processing control module; and 410—display.

DETAILED DESCRIPTION OF THE INVENTION

It should be noted that the embodiments of the present disclosure and the features in the embodiments can be combined with each other if there is no conflict. Below, the present disclosure is described in detail in connection with embodiments with reference to the accompanying drawings.

The inventors have found, through researches, that the three-dimensional high-resolution nondestructive imaging technology, such as CM, MPM, SHG, OCT, the ultrasound imaging technology and PAM are capable of realizing nondestructive, non-contact, high-resolution longitudinal-depth imaging, and have an inherent advantage of being suitable for three-dimensional printing on-line monitoring, but these three-dimensional high-resolution nondestructive imaging technologies have a problem of limited imaging volume. For example, the imaging depth of CM for a highly scattering sample is 0.1 mm-1 mm, the imaging depth of MPM is 0.4 mm-1.5 mm, the imaging depth of OCT is 2 mm-10 mm, the imaging depth of ultrasound and PAM is tens of millimeters, and there is a coupling tradeoff between the transverse resolution and the transverse imaging range of the five technologies. Therefore, it is a key point of the technology to apply the three-dimensional high-resolution nondestructive imaging technology to three-dimensional printing on-line monitoring to realize imaging volume increase and full-longitudinal-depth imaging.

FIG. 1 is a schematic structural diagram of a three-dimensional printing on-line monitoring system according to embodiments of the present disclosure.

As shown in FIG. 1, an embodiment of the present disclosure provides a three-dimensional printing on-line monitoring system, comprising: a printing parameter-controllable three-dimensional printing device and a three-dimensional high-precision nondestructive imaging system, wherein the printing parameter-controllable three-dimensional printing device comprises: a PC 1, a central control module 2, a print platform 3, a printhead 5, an X/Y/Z three-axis mobile module 6 and a printhead mounting arm 7, and the three-dimensional high-precision nondestructive imaging system comprises: a three-dimensional high-precision nondestructive imaging host 4 and a sample detection probe 8; the PC 1 is used for editing and analyzing a three-dimensional support model, editing printing parameters and detection parameters according to requirements, sending a processing instruction, and on-line monitoring the structure of the currently printed body and errors resulting from accumulation and overlaying-adhesion of one or more layers of a printing material in real time; the central control module 2 is used for receiving the processing instruction and controlling the printhead 5, the X/Y/Z three-axis mobile module 6 and the printhead mounting arm 7; the sample detection probe 8 is mounted on the printhead mounting arm 7 and shares a motion driving and controlling module with the printhead mounting arm 7; the three-dimensional high-precision nondestructive imaging host 4 is connected with the PC 1, and is used for transmitting data and controlling the sample detection probe 8 to complete scanning and imaging; the sample detection probe 8 moves, in cooperation with the print platform 3 or the printhead mounting arm 7, along the X axis/Y axis/Z axis, to complete one transverse area scanning and longitudinal-depth scanning, and at the moment, the sample detection probe 8 completes one detection, the printhead 5 continues printing, and when a certain printing thickness is reached, detection is performed again. The processes are repeated until the printing is completed; thereafter, the PC 1 reconstructs the detected data into a three-dimensional high-resolution global image, thereby achieving full-longitudinal-depth imaging.

Compared with the prior art, the three-dimensional printing on-line monitoring system of the embodiment of the present disclosure has the following advantages: by integrating a three-dimensional high-precision nondestructive imaging system into a three-dimensional printing device, longitudinal-depth segmented scanning and transverse splicing scanning are performed according to the specific imaging depth of the material and the imaging range of the sample detection probe and in cooperation with the movement of the three-dimensional printing device in the X/Y axial direction or the Z axial direction, three-dimensional full-longitudinal-depth and full-volume imaging is achieved by transverse and longitudinal automatic splicing, thereby effectively solving the problem that it is difficult to balance the transverse and longitudinal large fields of view and high precision in the three-dimensional printing on-line monitoring; and errors resulting from accumulation of multi-layer printing can further be detected, and optimization, regulation and control of the feedback of longitudinal-depth segment printing can be achieved, thereby improving the printing quality conformity.

It should be mentioned herein that the sample detection probe 8 cooperates with X/Y-axial movement or Z-axial movement of the print platform 3 or the printhead mounting arm 7 of the three-dimensional printing device, and if the transverse scanning requirement cannot be met, a three-axis movement module, a six-degree-of-freedom mechanical arm or the like may be added.

In the above, the three-dimensional high-precision nondestructive imaging host 4 can include: one of the OCT host, MPM host, SHG host, CM host, ultrasound imaging host and PAM host, or a combination of more than one of them, among which the OCT technology can be applied to a time domain OCT system, a swept-source OCT system, a spectral domain OCT system, a full-field OCT system, a fibre-optical OCT system, a free-space OCT system, and variants of such technology, e.g., doppler OCT, polarization OCT, OCPM, etc., or a commercial OCT system, e.g., the Telesto® series and GANYMEDE-II® series of Thorlabs Corp., IVS-1000/2000 of Santec Corp., etc. The MPM technology can be two-photon fluorescence microscopy imaging technology, three-photon fluorescence microscopy imaging technology, multi-focal-point multiphoton microscopy technology or commercial multiphoton fluorescence microscopy imaging technology, e.g., the FVMPE-RS system of Olympus Corp., Bergamo-II series of Thorlabs Corp., etc. The CM technology can be a laser scanning confocal spectral imaging system, a spinning-disk confocal microscope system, a programmable array microscope system or a commercial CM system, e.g., Zeiss LSM800® of Zeiss Corp., LEXT-OLS4100 of Olympus Corp., etc.

It should be mentioned that the embodiments of the present disclosure are not limited to the high-precision nondestructive imaging technology described above, instead, all of the three-dimensional high-precision nondestructive imaging technologies with certain imaging depth should fall within the protection scope.

Optionally, the sample detection probe 8 may comprise: a machine vision imaging module and a micro-tomography detection module, wherein the machine vision imaging module is used for field-of-view monitoring, and the micro-tomography detection module is used for small-range high-precision image acquisition.

Further, the printing parameters and the detection parameters edited by the PC 1 may include: an imaging depth H of the three-dimensional high-precision nondestructive imaging host, an effective imaging depth h, a thickness h0 of the top that cannot be cured within a short time after printing, an initially detected printing thickness h+h0, and a subsequently detected printing thickness h. The initially detected printing thickness h+h0 of the product can be set according to the effective imaging depth h and the imaging depth H of the OCT, MPM, SHG or CM host, and h+h0 should be smaller than or equal to the maximum imaging depth H, wherein the numerical value of the effective imaging depth h of the printed object, the numerical value of h in the initially detected printing thickness and the numerical value of the subsequently detected printing thickness h are the same.

Furthermore, segmentation for the longitudinal-depth scanning is performed based on the imaging depth H of the three-dimensional high-precision nondestructive imaging host and the effective imaging depth h. For example, the imaging depth of the CM for a highly scattering sample is 0.1 mm-1 mm, the imaging depth of the MPM is 0.4 mm-1.5 mm, and the imaging depth of the OCT is 2 mm-10 mm, and the effective imaging depth h is recommended to be 40%-70% of the imaging depth H.

Figures 1, 2:
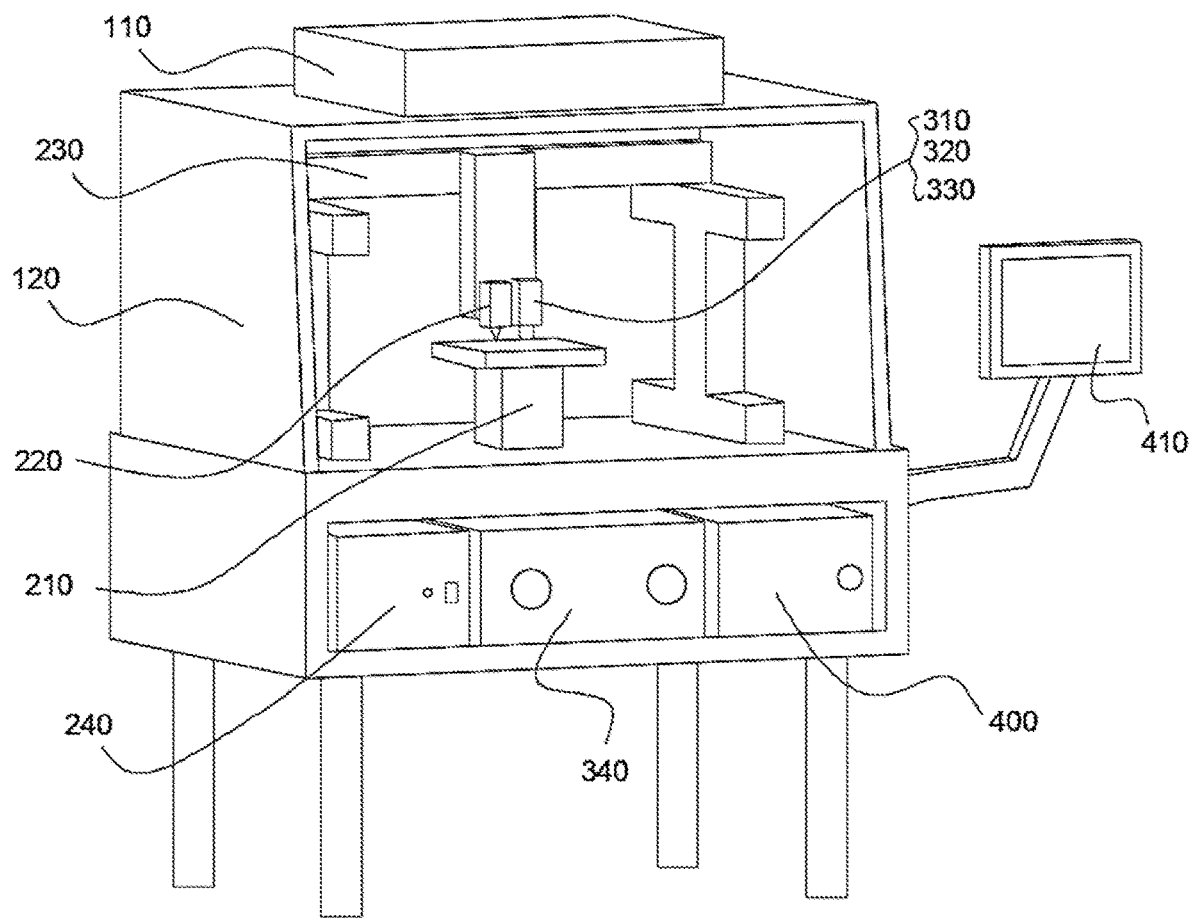
Figures 1, 2, 3:
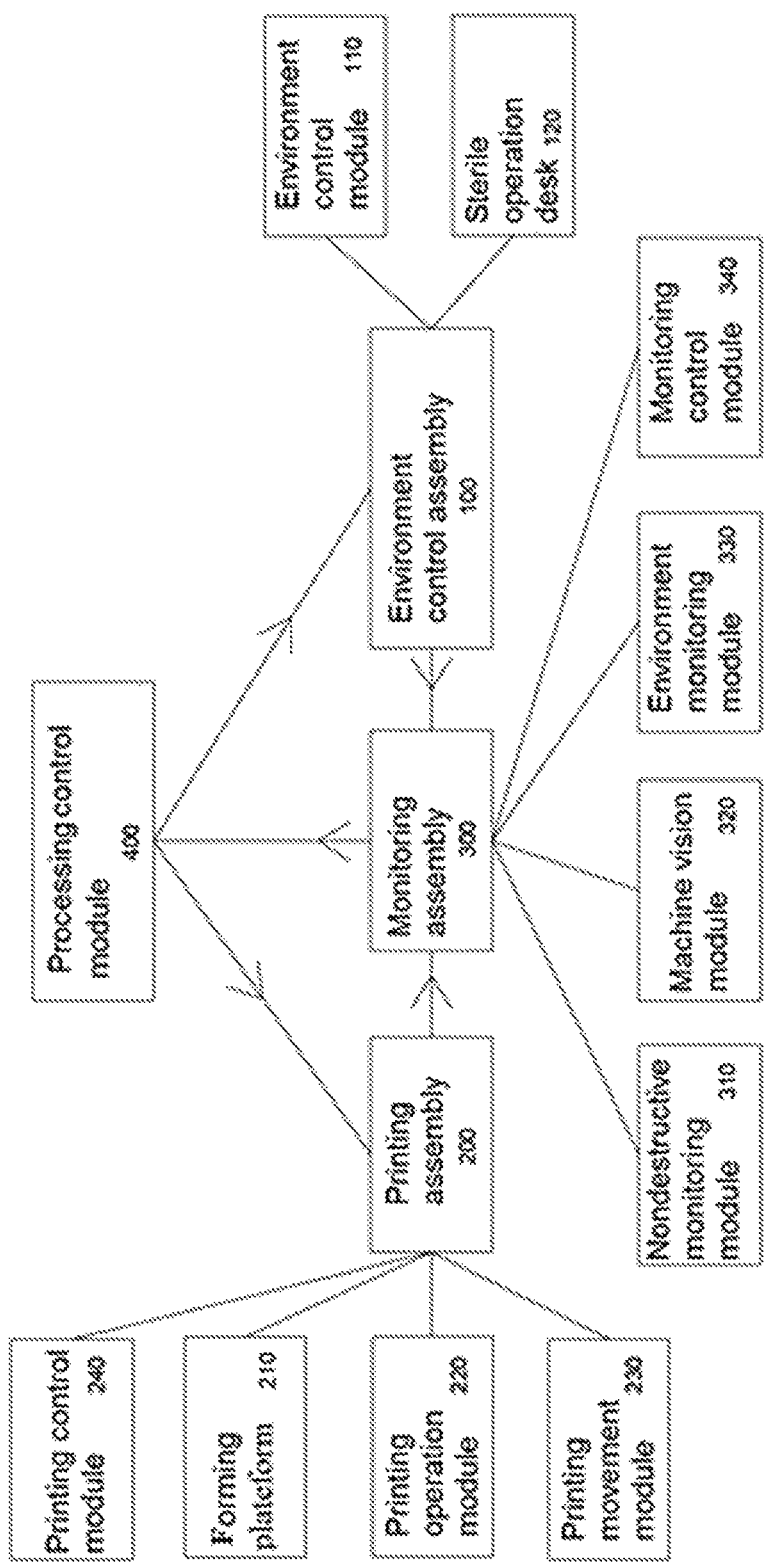
Figure 2:
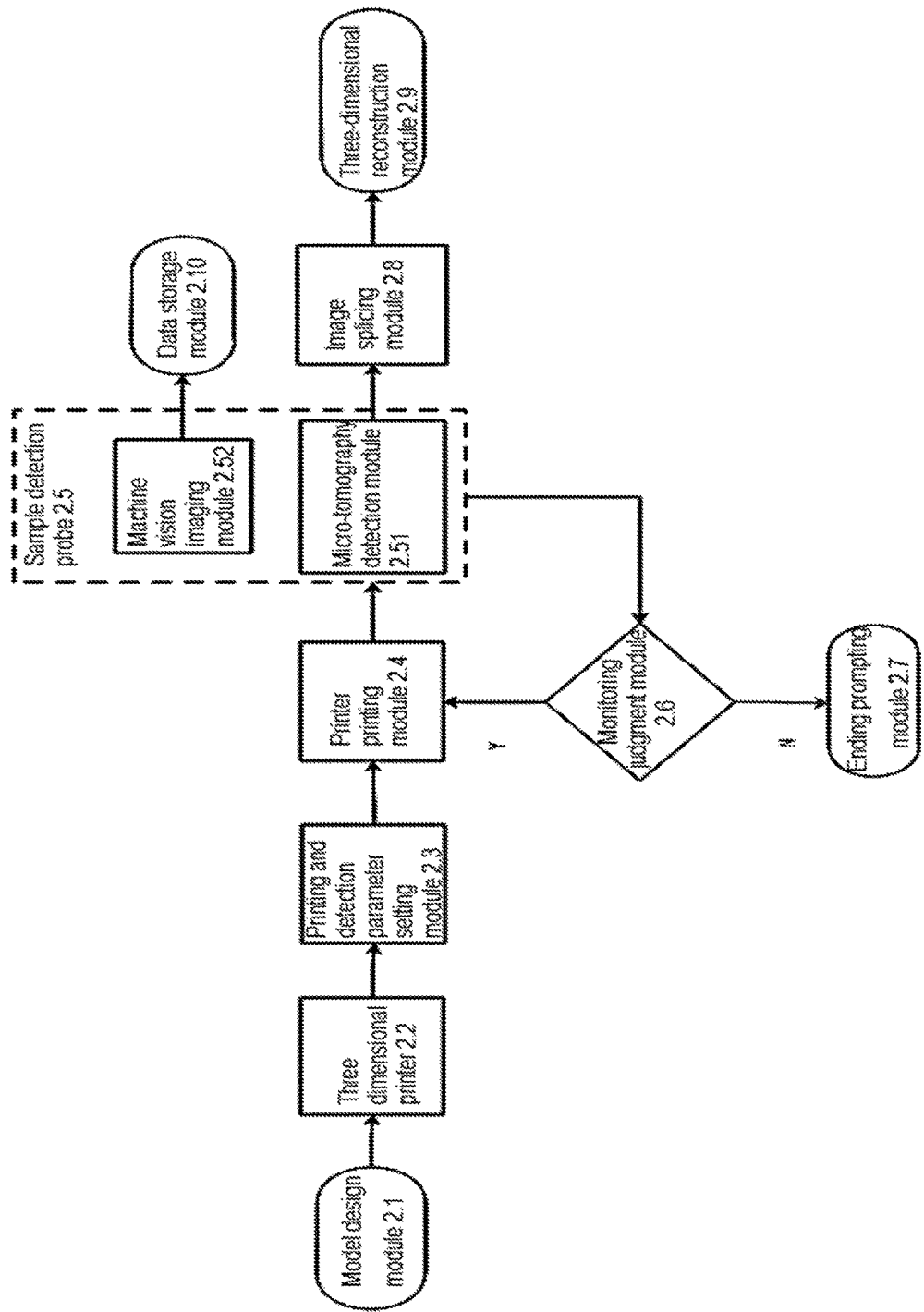
Figure 4:
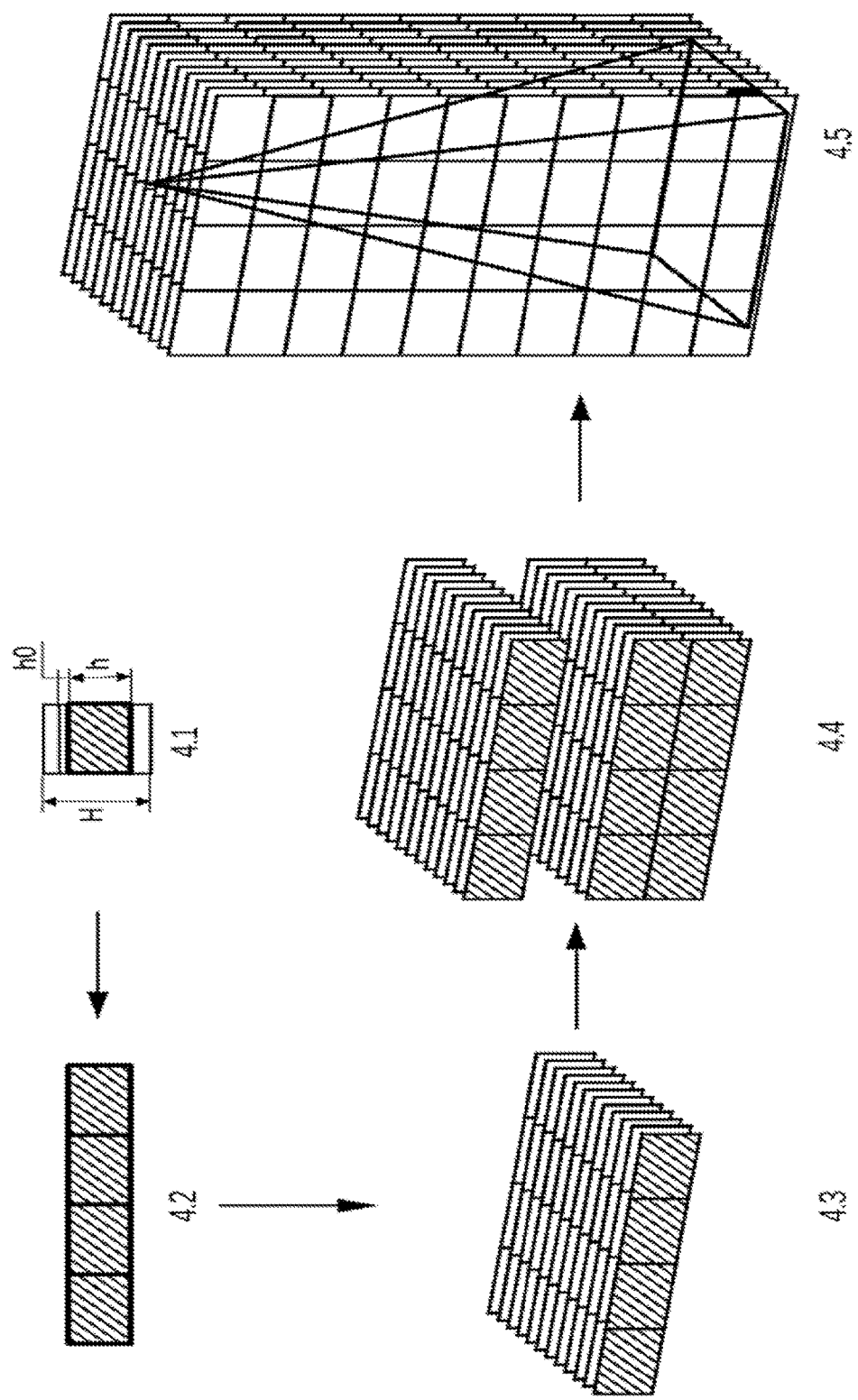
FIG. 4 is a schematic flow chart of a longitudinal splicing algorithm in a three-dimensional printing on-line monitoring method according to embodiments of the present disclosure.

FIG. 2 is a schematic flow chart of full-longitudinal-depth imaging monitoring in a three-dimensional printing on-line monitoring method according to embodiments of the present disclosure; FIG. 3 is a schematic flow chart of longitudinal-depth segmented scanning in a three-dimensional printing on-line monitoring method according to embodiments of the present disclosure; and FIG. 4 is a schematic flow chart of a longitudinal splicing algorithm in a three-dimensional printing on-line monitoring method according to embodiments of the present disclosure.

An embodiment of the present disclosure further provides a three-dimensional printing on-line monitoring method, as shown in FIG. 1, implemented by a printing parameter-controllable three-dimensional printing device and a three-dimensional high-precision nondestructive imaging system, wherein the printing parameter-controllable three-dimensional printing device comprises: a PC 1, a central control module 2, a print platform 3, a printhead 5, an X/Y/Z three-axis mobile module 6 and a printhead mounting arm 7, and the three-dimensional high-precision nondestructive imaging system comprises: a three-dimensional high-precision nondestructive imaging host 4 and a sample detection probe 8. The three-dimensional printing on-line monitoring method comprises integrating the three-dimensional high-precision nondestructive imaging system into the printing parameter-controllable three-dimensional printing device to real-time on-line monitor three-dimensional printing and incorporate multi-field-of-view collaborative visual images with each other, to achieve rapid positioning of transverse range for monitoring in a printing process; achieving full-longitudinal-depth imaging monitoring of the whole printing process by longitudinal-depth segmented scanning of a printing solidified layer and based on a longitudinal automatic splicing algorithm, and guiding printing parameter optimization and control of a next depth-increased segment by using in real time a result feedback of the longitudinal-depth segmented scanning, so as to achieve perform synchronous micro-tomography imaging on-line monitoring of the printing, as shown in FIGS. 2-4; and acquiring a three-dimensional high-resolution global image of an internal structure of a printed product, when completing the manufacturing of the printed product, thereby achieving quality control.

In the above, as shown in FIG. 2, the full-longitudinal-depth imaging monitoring is as follows: a support model designed by a model design module 2.1 is input into a three-dimensional printer 2.2, and printing parameters are set by a printing and detection parameter setting module 2.3; in the whole printing process, a micro-tomography detection module 2.51 in the sample detection probe performs scanning detection in real time, the machine vision imaging module 2.52 performs imaging in real time, with printing and detection carried out alternately in the whole process; every time one scanning is completed, one longitudinal-depth segmented scanning is realized, and a monitoring judgment module 2.6 judges whether the printing needs to be continued or not, where if the printing is not completed and the printing needs to be continued (denoted by Y), the printing adjustment information is fed back to a printer printing module 2.4, and the printing is continued, and if the printing is completed and no further printing is needed (denoted by N), an ending prompting module 2.7 gives a prompt that the printing is ended, and the detection is also ended at the same time; during the printing monitoring process, the micro-tomography detection module 2.51 inputs the detection information into an image splicing module 2.8 when monitoring the printing process, and the image splicing module 2.8 finishes image splicing of two adjacent scanning results through a longitudinal splicing algorithm, and finally, a three-dimensional reconstruction module 2.9 finishes three-dimensional high-resolution global image reconstruction of the printed product; the machine vision imaging module 2.52 also transmits the images to a data storage module 2.10; and in the full-longitudinal-depth imaging monitoring process, the PC generates a printing path and a motion path of the detection probe of the micro-tomography detection module according to the set parameters.

Optionally, as shown in FIG. 3 in conjunction with FIG. 1, the longitudinal-depth segmented scanning is as follows: the sample detection probe 8 cooperates with the Z-axial movement of the print platform 3 or the printhead mounting arm 7 of the three-dimensional printing device to achieve scanning of a set imaging depth in cooperation, as shown in Step 3.1; the support exceeding the set transverse scanning range, cooperates with the X/Y-axial movement of the print platform 3 or the printhead mounting arm 7 of the three-dimensional printing device, to perform scanning in a checkerboard-type detection mode or other detection modes facilitating image splicing so as to achieve scanning of a set transverse scanning area, as shown in Step 3.2, i.e., the detection system first detects a certain region of the model, and then moves, by the print platform 3 or the printhead mounting arm 7, to another region adjacent to the certain region for detection, the detection proceeds in a similar fashion until a single detection is completed; based on this, the PC 1 achieves, through the longitudinal splicing algorithm, splicing and longitudinal superimposition of the images obtained by the multiple scanning to complete the reconstruction of the three-dimensional high-resolution global image of the entire printed product, as shown in the Step 3.3.

Further, as shown in FIG. 4, the splicing process based on the longitudinal splicing algorithm is as follows: longitudinal-depth segmented scanning is first performed according to Step 4.1, for the obtained data, the images are sequentially transversely spliced through an image splicing algorithm according to 4.2 to complete image splicing for each single detection and obtain the rendering (effect picture) 4.3, and then the data obtained by different scans are spliced according to Step 4.4, to finally obtain a three-dimensional reconstruction model 4.5.

It should be mentioned herein that there are two modes for generating the abovementioned longitudinal splicing algorithm according to the difference in imaging principle, one being XZ-direction splicing, and the other being XY-direction splicing, wherein the XY-direction splicing is similar to the XZ-direction splicing, except that images are spliced in the XY direction, rather than the XZ direction.

In practical applications, the printing parameter-controllable three-dimensional printing device includes: industrial three-dimensional printing device, biological three-dimensional printing device and medical three-dimensional printing device. Surely, the three-dimensional printing device is not limited to these kinds of three-dimensional printing devices, but rather including other reasonable three-dimensional printing devices.

The three-dimensional printing on-line monitoring method and system provided by the embodiments of the present disclosure propose integrating the three-dimensional high-precision nondestructive imaging technology into a three-dimensional printing device according to the three-dimensional printing on-line monitoring requirements in combination with the characteristics of three-dimensional printing discrete manufacturing and printing error accumulation, and applying the same to the three-dimensional printing on-line monitoring, to incorporate the multi-field-of-view collaborative visual images with each other and achieve rapid positioning of transverse range of monitoring in a printing process; achieves full-longitudinal-depth imaging monitoring of the whole printing process by longitudinal-depth segmented imaging of the printing solidified layer and based on longitudinal automatic splicing algorithm, acquires the high-precision internal structural information of the whole printed product, and at the same time, can achieve printing parameter optimization and control of the longitudinal-depth segments by using the longitudinal-depth segmented imaging results, so as to achieve on-line synchronous monitoring of printing and micro-tomography.

Embodiment 1

The embodiment of the system for on-line monitoring three-dimensional printing and OCT micro-tomography synchronously is as follows. The common OCT imaging depth H is 2-10 mm, and the imaging range is 10×10 mm. In the following, three representative imaging depths were selected, i.e., 2 mm, 6 mm and 10 mm. A sample was a hydrogel support having a size of 20×20×20 mm. Since the filament diameter in the printing of a three-dimensional printer is generally 0.15-0.3 mm and the thickness is controlled to be thickness of 2-4 layers, h0 is set to be 0.6 mm. Due to the difference in the OCT imaging depth, the effective imaging depth h needs to be determined according to the OCT imaging depth. The specific experimental results are shown in the following table:

TABLE 1

| Imaging depth H | 2 mm | 6 mm | 10 mm |
| --- | --- | --- | --- |
| Top thickness h0 | 0.6 mm | 0.6 mm | 0.6 mm |
| Effective imaging depth h | 1 mm | 4 mm | 7 mm |
| Product printing thickness | 20h + h0 | 5h + h0 | 3h + h0 |
| Imaging result | √ | √ | √ |

The experimental results showed that all of the different imaging depths of the OCT could satisfy the requirement of on-line monitoring, and the reconstructed three-dimensional high-resolution global images were not obviously different from one another, and all of them satisfied the requirement. Among the above parameters, the OCT imaging depth H is related to the type, density, etc. of the material, and the depth of 6 mm is recommended for general biological applications. The thickness h0 of the top that cannot be cured within a short time after printing (referred to as top thickness) can be determined according to the filament diameter and the printing material of different printers, and the thickness h0 is generally recommended to be the thickness of 2-4 printed layers. The effective imaging depth h needs to be determined according to the OCT imaging depth and the printing material, and the effective imaging depth h is generally recommended to be 40%-70% of the imaging depth H.

Embodiment 2

The implementation mode of the system for on-line monitoring three-dimensional printing and MPM micro-tomography synchronously is the same as that of the OCT on-line monitoring. But since the MPM has a different imaging depth from the OCT, the selection of parameters is different and the following are typical recommended parameters:

TABLE 2

| imaging depth H | 0.5 mm | 1 mm | 1.5 mm |
|---|---|---|---|
| Top thickness h0 | 0.2 mm | 0.2 mm | 0.2 mm |
| Effective imaging depth h | 0.2 mm | 0.6 mm | 1 mm |
| Product printing thickness | 100h + h0 | 33h + h0 | 20h + h0 |
| Imaging result | √ | √ | √ |

Embodiment 3

The implementation mode of system for on-line monitoring three-dimensional printing and CM micro-tomography synchronously is the same as that of the OCT and MPM on-line monitoring. Due to the imaging depth of the CM, it is more suitable for occasions with relatively small imaging depth and high single precision requirement.

TABLE 3

| Imaging depth H | 100 um | 200 um | 400 um |
|---|---|---|---|
| Top thickness h0 | 10 um | 10 um | 10 um |
| Effective imaging depth h | 50 um | 160 um | 250 um |
| Product printing thickness | 400h + h0 | 125h + h0 | 80h + h0 |
| Imaging result | √ | √ | √ |

Embodiment 4

Embodiment 4-1

Figures 1, 5:
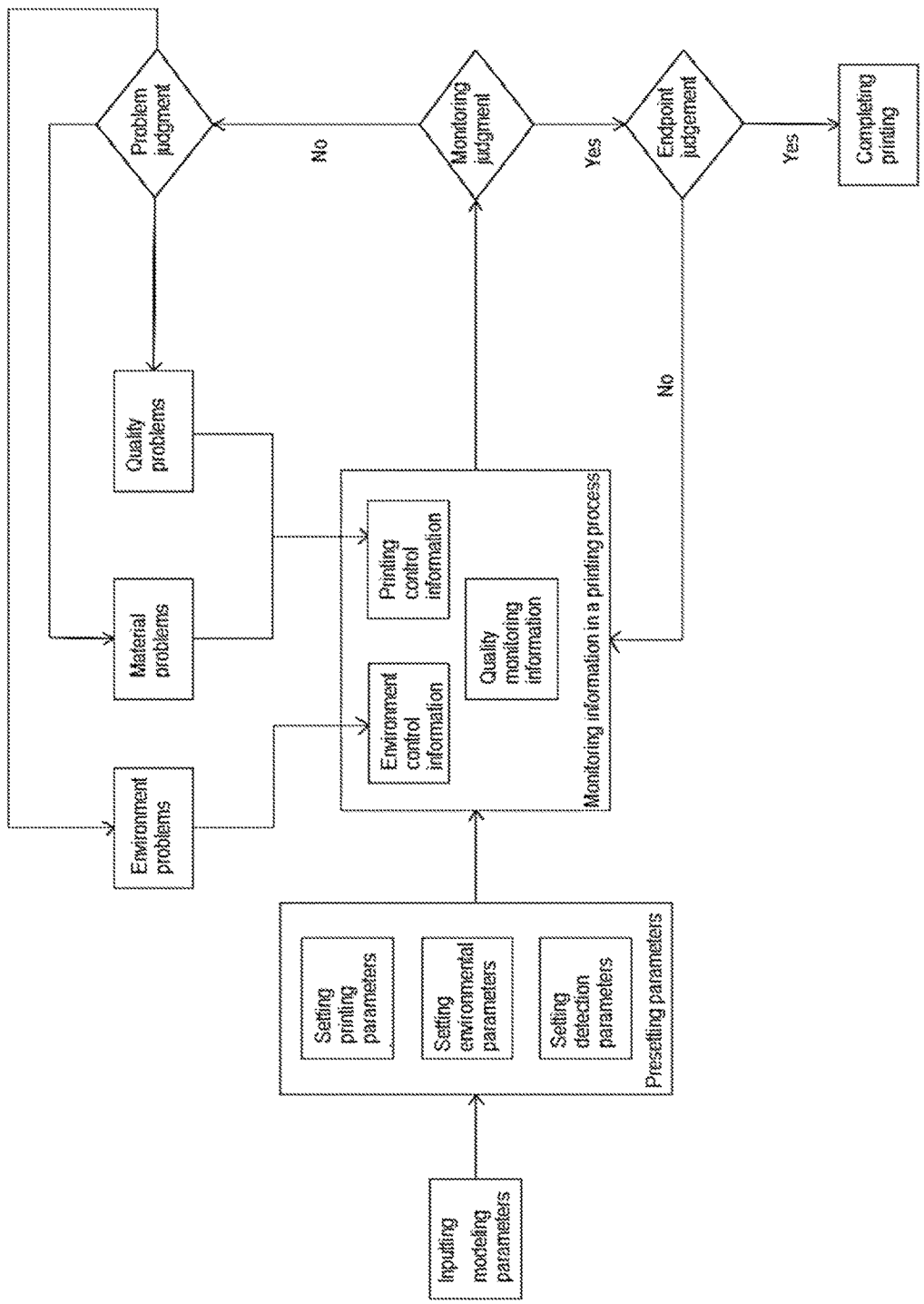
Figures 2, 5:
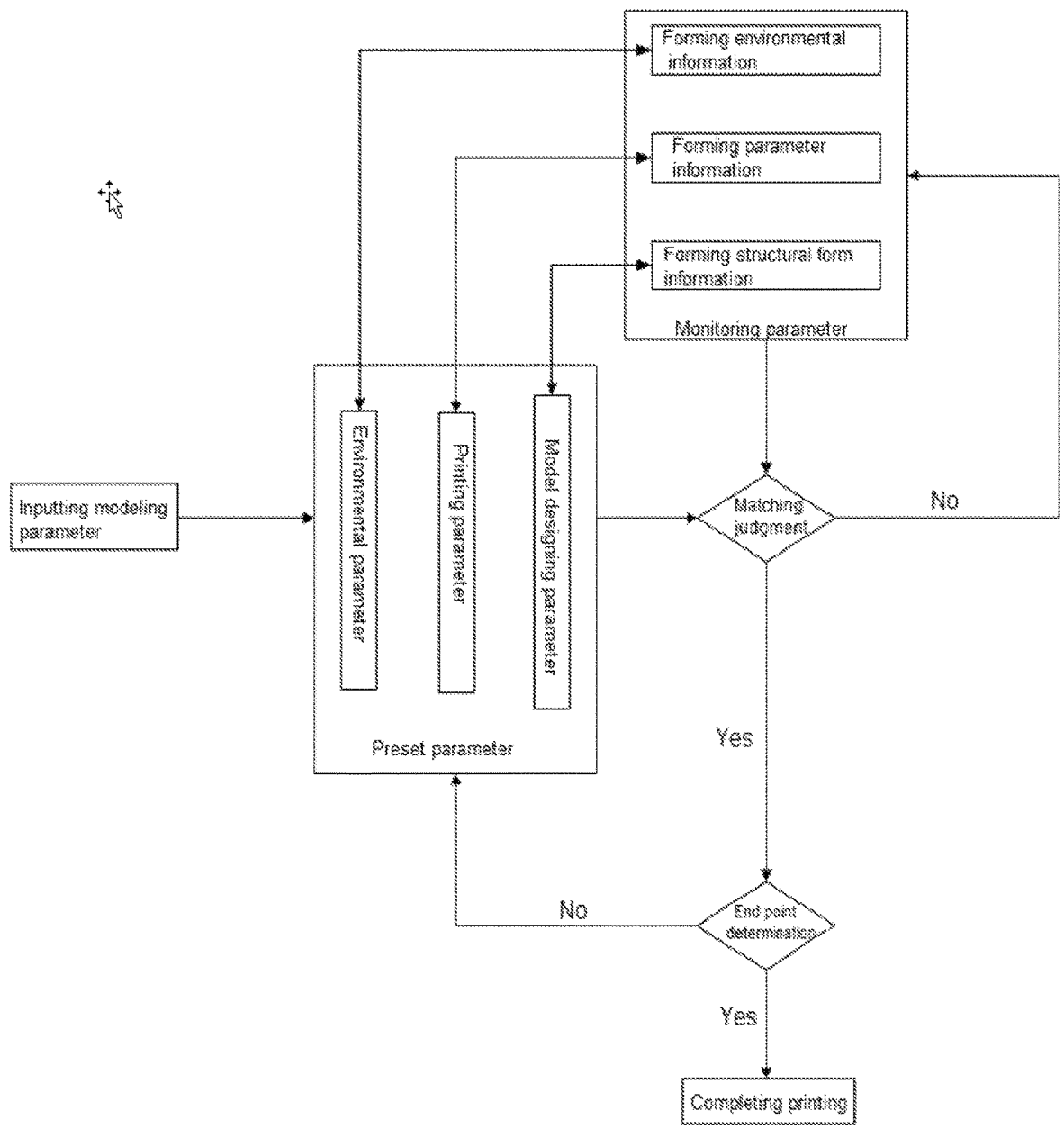
Figures 1, 7:
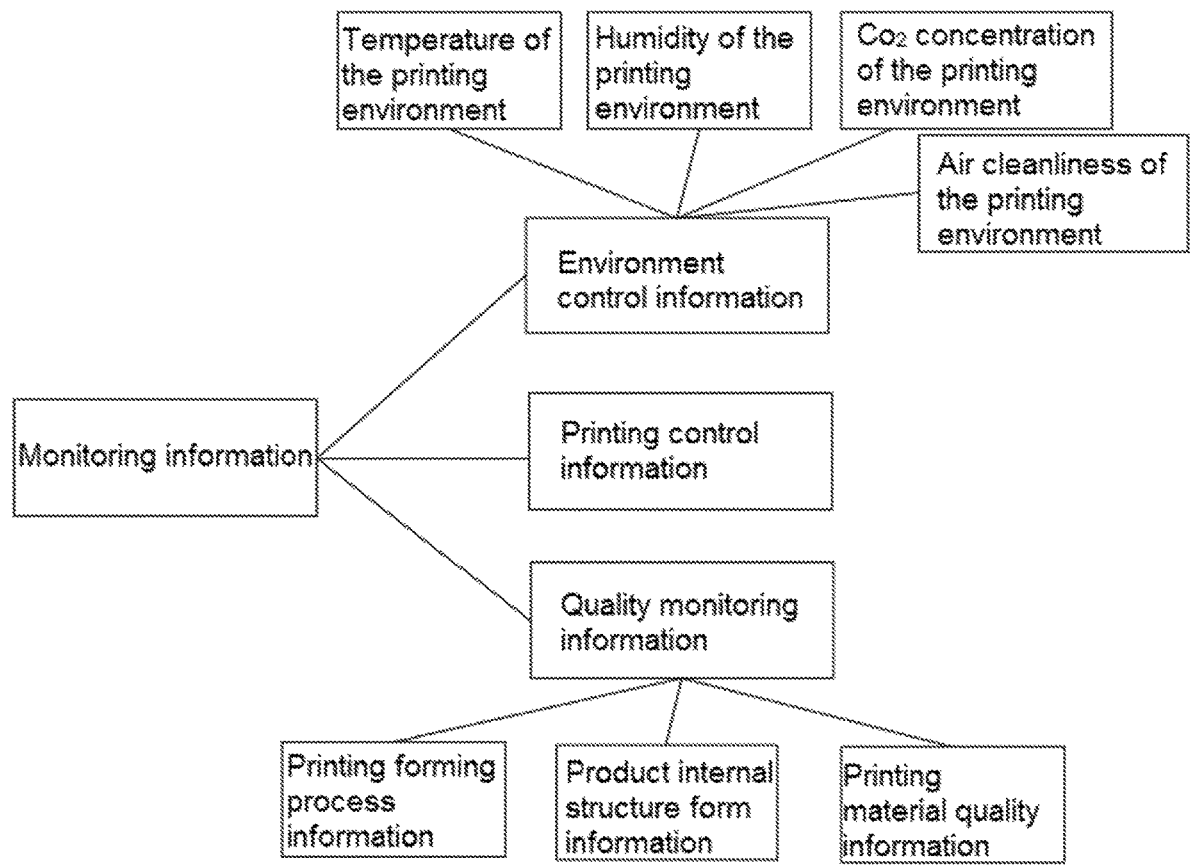
Figures 2, 7:
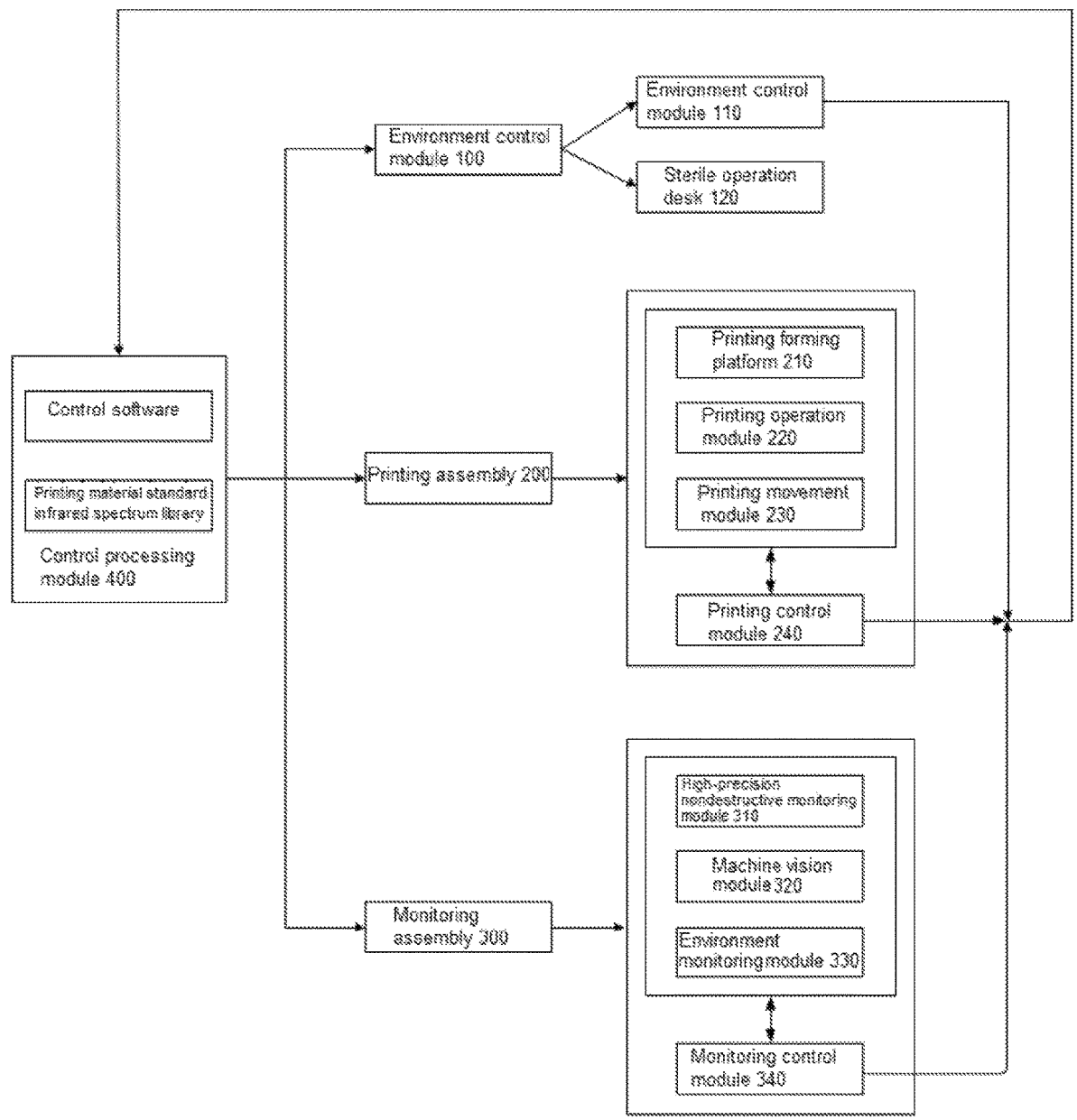
Figure 8:
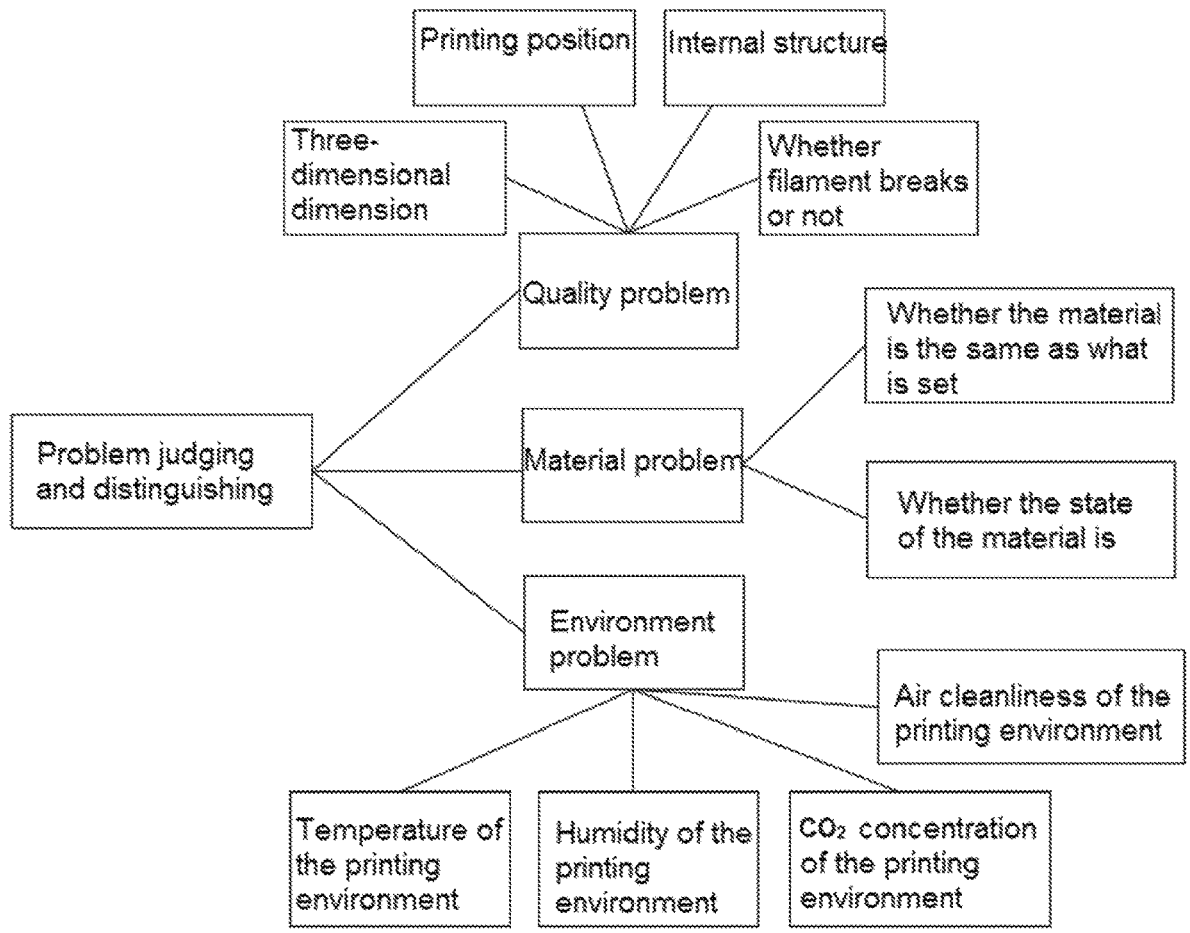
FIG. 8 is a frame diagram showing problem judgment and distinguishing in a three-dimensional printing real-time monitoring method according to embodiments of the present disclosure.

Referring to the frame diagram of a three-dimensional printing real-time monitoring method shown in FIG. 5-1, and referring to FIG. 7-1 and FIG. 8, the method can be executed on a controller of a printer, and comprises:

inputting modeling parameters for determining a to-be-printed three-dimensional model into the controller of the printer, wherein the modeling parameters may be directly generated in the controller, or the modeling parameters may be input;

setting preset parameters in the controller of the printer, wherein the product printed according to the preset parameters has excellent quality, therefore the preset parameters are used as a standard comparison library, and the preset parameters include printing parameters, environmental parameters and detection parameters, optionally, the printing parameters include an extrusion pressure of the printhead, the thickness (layer height) of the currently printed layer, the filament diameter (printing filament diameter) of the printing material, the temperature of the printhead, etc., the environmental parameters include temperature, humidity, carbon dioxide concentration, air cleanliness and the like of the working environment of the printer, and the detection parameters include printing forming process detection parameters of a product, internal structural form detection parameters of a product and printing material detection parameters, wherein for these parameters, some are provided with specific determined values, and some are provided with a numerical range, for example, for the printing forming process detection parameters, the specific advancing track is given, and for the extrusion pressure of the printhead, a numerical range is given; the preset parameters can be set on a cloud server, and the controller can communicate with the server to acquire the preset parameters;

starting printing and monitoring the control parameters and the quality of the printed product in the printing process, and collecting the monitoring information, wherein the monitoring information is for invoking by the controller, or is directly transmitted to the controller after being collected; the monitoring information comprises environment control information, printing control information and product quality monitoring information, specifically, the environment control information includes various parameters of the working environment in the working process of the printer, e.g., temperature, humidity, carbon dioxide concentration, air cleanliness and the like of the working environment; the printing control information comprises control parameters of the printer itself in the printing process, e.g., the extrusion pressure of the printhead, the thickness (layer height) of the currently printed layer, the filament diameter (printing filament diameter) of the printing material, the temperature of the printhead, etc.;

the controller comparing the monitoring information with the preset parameters, wherein when the monitoring information conforms to the preset parameters, the printing of the current layer is finished, and then if the controller judges that the current layer is the end surface, the printing work is completed; and if the controller judges that the current layer is not the end surface, then the printing work continues.

When the monitoring information does not conform to the preset parameters, the controller performs problem judgment on the monitoring information, and finds out the problems; optionally, the environment control information is compared with the environmental parameters to determine whether the environment control information conforms to the environment parameters; the printing forming process parameters of the product is compared with the product printing forming process detection parameters to determine whether the printing forming process parameters of the product conforms to the printing forming process detection parameters of the product; the product internal structural form information is compared with the product internal structural form detection parameters to determine whether the internal structural form monitoring information conforms to the product internal structural form detection parameters; the printing material quality information is compared with the printing material detection parameters to determine whether the printing material quality information conforms to the printing material detection parameters; and in the aforesaid judgement performed by the controller, correction is made to the control where the monitored information does not conform to the preset parameters such that it conforms to the preset parameters, then, the printing work continues.

The problem judgment in the printing monitoring process comprises performing judgment on the three-dimensional size of the printed sample, the printing position and the internal structure, the occurrence of filament breaking, etc.; performing judgment on the material problems including whether the printing material is the same as preset and whether the state of the printing material is good or not; performing judgment on environmental problems including printing temperature, humidity, carbon dioxide concentration, air cleanliness and the like, to finally achieve a three-dimensional structural diagram formed after the completion of the printing of the sample and at the same time generate quality monitoring reports including a printing environment monitoring report, a printing material quality monitoring report and a printing sample real-time monitoring report. The printing monitoring information includes the functions of environment control, printing control, quality monitoring control, etc., and the quality monitoring control function comprises a printing forming process and internal structural form monitoring function and a printing material quality monitoring function.

Figures 1, 6:
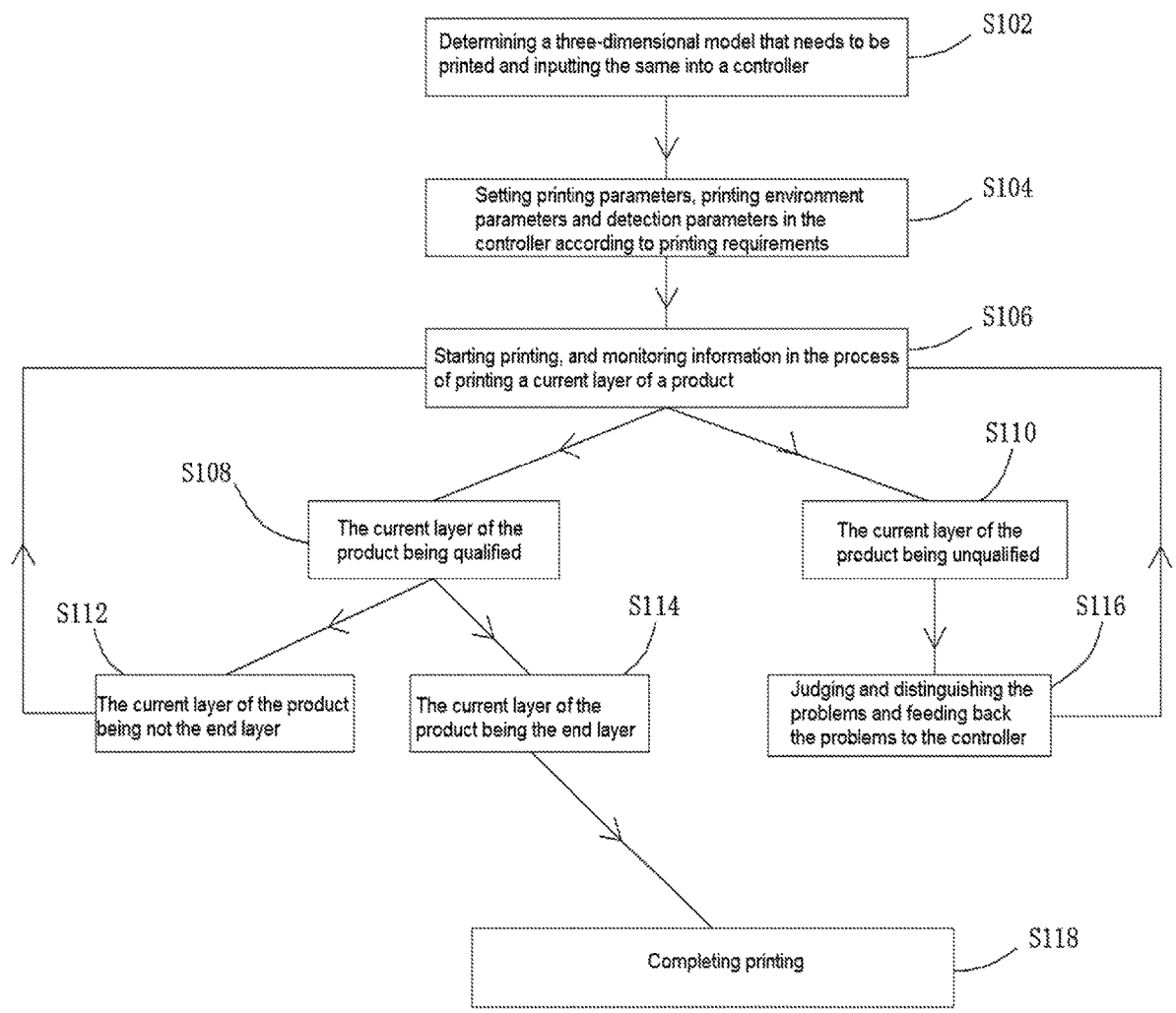
Figures 2, 6:
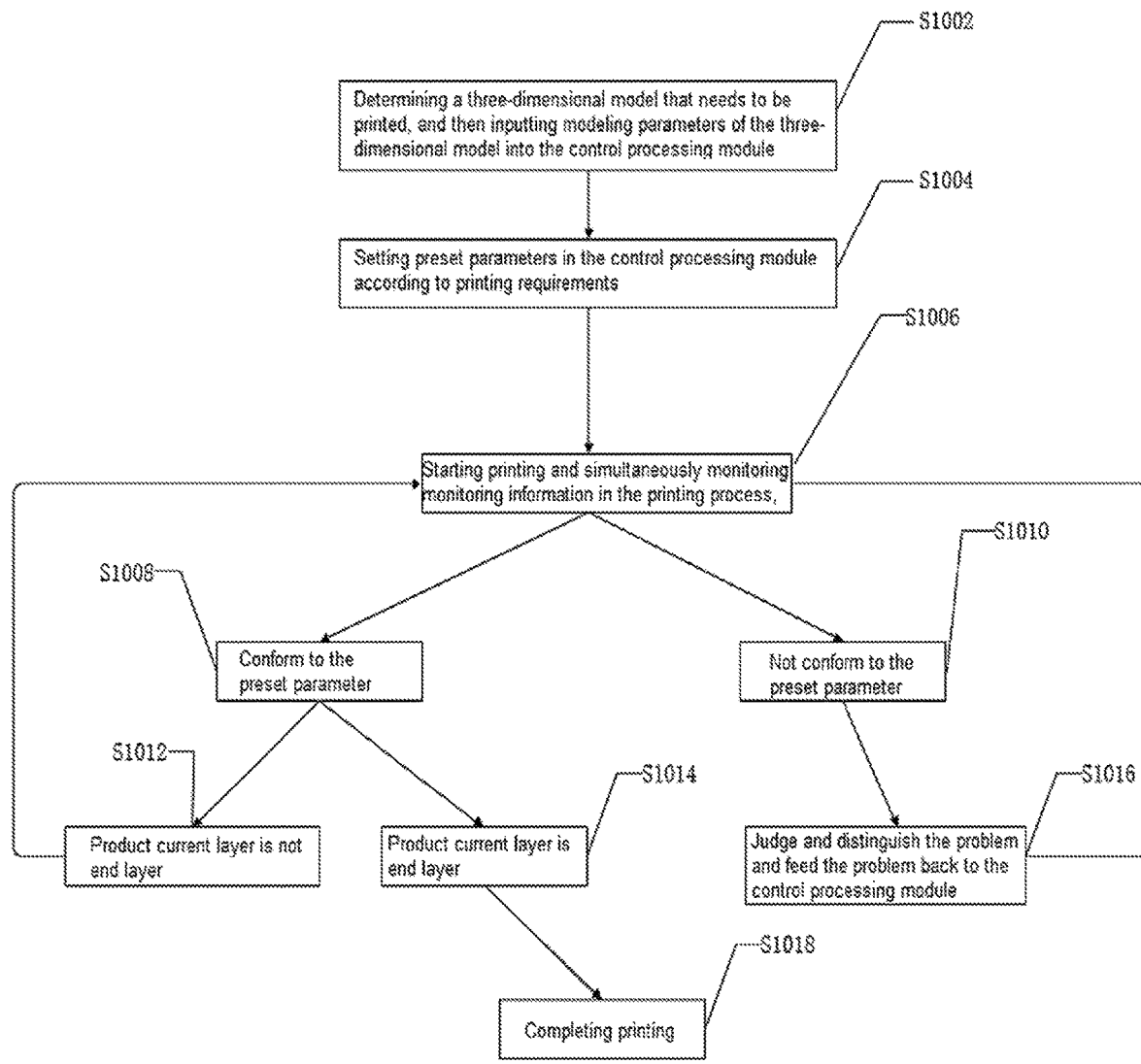

Referring to the flow chart of a three-dimensional printing real-time monitoring method shown in FIG. 6-1, and referring to FIG. 7-1 and FIG. 8, the method can be executed on a controller of a printer, and comprises the steps of:

S102: determining a three-dimensional model that needs to be printed, and then inputting modeling parameters of the three-dimensional model into the controller.

S104: setting preset parameters, such as preset printing parameters, printing environment parameters and detection parameters, in the controller according to the determined three-dimensional model.

Optionally, the preset parameters vary correspondingly in accordance with different three-dimensional models or different printing materials used by the three-dimensional models. For example, for the printing of an ornamental product and the printing of a loadbearing element, since the ornamental product and the loadbearing element have different requirements on mechanical strength of the structure, i.e. the ornamental product does not require a great mechanical strength, but the loadbearing element requires a relatively greater mechanical strength, the preset parameters set in the controller for the printing of the ornamental product are different from those set in the controller for the printing of the loadbearing element. Optionally, the printing of the ornamental product and the printing of the loadbearing element are different in the factors such as the printing advancing track and the temperature of the printhead, etc. For another example, for the printing of a biological tissue or organ and the printing of an ornamental product, since the printing of a biological organ and the printing of an ornamental product have different requirements on the aspects such as the environment, the material, the temperature and the like, the preset parameters set in the controller for the printing of the biological organ are different from those set in the controller for the printing of the ornamental product at least in these factors.

S106: starting the printing operation, monitoring various aspects of the printer in the printing operation, and collecting information to form monitoring information.

Optionally, in the printing process, the environment control information of the printer, the printing control information of the printer and the quality monitoring information of the printed product are all monitored, and then the monitoring information is collected and transmitted to the controller.

S108: the controller comparing the collected monitoring information with the preset parameters, wherein when the monitoring information conforms to the preset parameters, the controller judges whether the layer under printing is an end layer.

S114: stopping the printing operation, when the controller determines that the layer under printing is the end layer (that is, the product is finished).

S118: the printer sending a prompt signal, and an operator taking out the finished printed product.

After Step 108, the method can further comprise S112: continuing the printing operation when the controller determines that the layer under printing is not the end layer (that is, the product was not finished), until the layer under printing is the end layer, completing the printing operation.

In the present embodiment, the method can further comprise:

S110: the controller comparing the collected monitoring information with the preset parameters, and the controller controlling, when the monitoring information does not conform to the preset parameters (that is, the product is unqualified), the printer to stop working;

S116: the controller analyzing and comparing the monitoring information, and then correcting and optimizing the control parameters of the printer, and continuing the printing operation until the printed product is qualified.

Embodiment 4-2

In order to facilitate understanding of the three-dimensional printing real-time monitoring method provided by the above embodiment, an embodiment of the present disclosure provides a three-dimensional printing real-time monitoring apparatus, referring to the three-dimensional printing real-time monitoring apparatus shown in FIG. 1-2 and FIG. 1-3, this apparatus comprising:

an environment control component 100 for controlling and adjusting the working environment of a printer; a printing assembly 200 provided in the environment control component 100 and used for executing the printing of a product according to modeling parameters stored in the printer; a monitoring assembly 300 provided in the printing assembly 200 and used for acquiring monitoring information of a layer under printing (currently printed layer); a processing control module 400 for storing preset parameters, storing the modeling parameters, receiving the monitoring information, performing comparison and analysis on the monitoring information and the preset parameters, and controlling the environment control component 100 and the printing assembly 200 and/or performing optimization and correction on the modeling parameters, when the monitoring information does not conform to the preset parameters, so that the printed product conforms to the preset parameters.

In order to enable an operator to accurately acquire the printing condition of the printer, a display 410 can be provided, and a user can view the information such as the key data and the printing progress on the display 410.

A control host of the controller is equipped with control software and a standard infrared spectrum library, wherein the control software controls the operation of various functional modules of a three-dimensional printing apparatus, making corresponding judgment on the monitoring data, and making corresponding adjustment; and the standard infrared spectrum library is used for the comparison with the spectrums of the printing material collected by the high-precision nondestructive monitoring module 310, so as to monitor the conditions of matching and state of the printing material.

The preset parameters include three functions, i.e., detection parameter setting, environmental parameter setting and printing parameter setting, which support all-parameter data setting on the aspects of the printing environment, the printing material and the printing quality in the sample printing process, and provide data for a monitoring report. The detection parameters include detection parameters of sample printing forming process and internal structural form, and printing material detection parameters. Moreover, the infrared spectrum information of the printing material required can be acquired through the infrared spectrum of the high-precision nondestructive monitoring module 310, and then stored in the infrared spectrum library of the controller, so as to facilitate real-time monitoring of the printing material in the printing process.

In practice, the environment control component 100 comprises an environment control module 110 and a sterile operation desk 120, the environment control module 110 is connected with the processing control module 400; the environment control module 110 can regulate and control the temperature, humidity and carbon dioxide concentration in the working environment of the printer; moreover, the environment control module 110 is further provided with an air filtering device for controlling the particle content in the air and achieving ultraviolet sterilization and/or ozone sterilization; and the sterile operation desk 120 is used for bearing the printing assembly 200, and providing, in cooperation with the environment control module 110, an environment parameter-controllable, sterile and dust-free operation environment for the three-dimensional printing apparatus.

In practice, the printing assembly 200 comprises: a forming platform 210 connected with the environment control component 100 and used for bearing a printed product and capable of adjusting its own temperature; a printing operation module 220 that is used for printing a product and is capable of changing the printhead type thereof and adjusting the temperature of the printhead; a printing movement module 230 for driving the printing operation module 220 to move in the three directions of X, Y and Z in the environment control component 100; a printing control module 240 connected with the processing control module 400 and used for controlling the forming platform 210, the printing operation module 220 and the printing movement module 230 to complete the printing work.

In practice, the monitoring assembly 300 comprises: a high-precision nondestructive monitoring module 310 for monitoring the internal structural form of a product; a machine vision module 320 for monitoring the product printing forming process; an environment monitoring module 330 for monitoring the printing working environment; a monitoring control module 340 connected with the processing control module 400 and used for collecting information acquired by monitoring of the high-precision nondestructive monitoring module 310, the machine vision module 320 and/or the environment monitoring module 330 to form monitoring information and uploading the monitoring information to the processing control module 400.

The detection component and the camera of the high-precision nondestructive monitoring module 310 are both installed within the monitoring probe, and cooperate with each other through a coaxial system without interfering with each other. The machine vision module 320 based on high-definition image acquisition has the function of high-definition image acquisition, and is capable of rapidly recognizing the profile and position information of the sample by utilizing large field-of-view high-definition images of a machine vision system and utilizing a specific image recognition algorithm, which assists the three-dimensional high-precision nondestructive detection module 310 in rapid positioning and determining the scanning position. Moreover, the three-dimensional high-precision nondestructive detection module 310 based on the optical coherence technology has the advantages of large penetration depth, high detection precision, being nondestructive to the sample due to non-contact, etc., and is capable of simultaneously accomplishing the printing material infrared spectrum acquisition function and the sample internal structural data acquisition function.

In practice, the monitoring assembly 300 comprises a high-precision nondestructive monitoring module 310 based on the optical coherence technology, a machine vision module 320 based on high-definition image acquisition and an environment monitoring module 330 based on multiple sensors; and the processing control module 400 pre-stores a standard infrared spectrum library for the comparison with the spectrum of the printing material collected by the nondestructive monitoring apparatus, and monitors the matching and state conditions of the printing material.

Using the above method, it is possible to achieve monitoring on the printing material, the printed sample and the internal environment of the printer while performing printing, by combination of the parameter-controllable printing assembly 200, the environment monitoring module 330, the high-precision nondestructive monitoring module 310 and the controller, and under the control of the controller, i.e., it is possible to monitor in real time the condition of the replacement of the printing material, and the forming structure of the surface of the layer under printing of the printed sample, give a prompt of printing defects such as drooling and filament breaking, etc., and monitor the high-precision internal structural form, the deformation of the material after layer superimposition and the error caused thereby, and the changes of the parameters of the internal environment of the printer, such kind of information is fed back to the controller in real time for processing, so as to judge the current printing state, distinguish the problems, adjust the printing parameters in real time, and optimize the printing quality.

Embodiment 5

Referring to the embodiments of the present disclosure shown in FIG. 1-2, there is provided a three-dimensional printing real-time on-line monitoring apparatus, referring to the structural block diagram of the three-dimensional printing real-time on-line monitoring apparatus provided by embodiments of the present disclosure shown in FIG. 1-3, comprising:

an environment control component 100 for controlling and adjusting the working environment of a printer; a printing assembly 200 provided in the environment control component 100 and used for executing the printing of a product according to modeling parameters stored in the printer; a monitoring assembly 300 provided in the printing assembly 200 and used for acquiring monitoring information of a printing process; a processing control module 400 for storing preset parameters, storing the modeling parameters, receiving the monitoring information, performing comparison and analysis on the monitoring information and the preset parameters, and controlling the environment control component 100 and the printing assembly 200 and/or performing optimization and correction on the modeling parameters, when the monitoring information does not conform to the preset parameters, so that the printed product conforms to the preset parameters.

In order to enable an operator to accurately acquire the printing condition of the printer, a display 410 can be provided, and a user can view the information such as the key data and the printing progress on the display 410.

The printing assembly comprises: a forming platform 210, a printing operation module 220, a printing movement module 230 and a printing control module 240, wherein in practical applications, the printing operation module 220 may be a printhead installed on a printhead mounting arm, the printing movement module 230 may be an X/Y/Z three-axis mobile module; wherein the printhead may have a self-defined partitioned-area temperature control function, and different partitioned areas may have different requirements on temperature according to the printing material, the printhead is divided into four parts, namely a storage area, a transition area, an extrusion area and a forming area, timely and different output state parameter adjustment may be performed in accordance with the different process positions of the printing material, including temperature regulation and control of different partitioned areas, so as to control the printing material to change into the currently most reasonable state at the corresponding process position.

The monitoring assembly comprises a high-precision nondestructive monitoring module 310, a machine vision module 320, an environment monitoring module 330 and a monitoring control module 340; in practical applications, the high-precision nondestructive monitoring module 310 comprises a three-dimensional high-precision nondestructive imaging host and a two-dimensional high-speed sample detection probe; wherein the machine vision module 320 is used for field-of-view monitoring, the high-precision nondestructive monitoring module 310 may be a micro-tomography monitoring module in practical applications, and is used for small-range high-precision image acquisition and printed object quality monitoring.

In the above, the high-precision nondestructive monitoring module 310 can realize the advantages of large penetration depth, high detection precision, being nondestructive to the samples due to non-contact, etc. by using the technology of one of the optical coherence tomography (OCT) host, multiphoton microscopy (MPM) host, a second harmonic generation (SHG) host, confocal microscopy (CM) host, ultrasound imaging host and photoacoustic microscopy (PAM) host or a combination of more than one of them and can also accomplish the printing material infrared spectrum acquisition function and the sample internal structural data acquisition function.

In the above, the OCT technology can be applied to a time domain OCT system, a swept-source OCT system, a spectral domain OCT system, a full-field OCT system, a fibre-optical OCT system, a free-space OCT system, and variants of such technology, e.g., doppler OCT, polarization OCT, OCPM, etc., or a commercial OCT system, e.g., the Telesto® series and GANYMEDE-II® series of Thorlabs Corp., IVS-1000/2000 of Santec Corp., etc. The MPM technology can be two-photon fluorescence microscopy imaging technology, three-photon fluorescence microscopy imaging technology, multi-focal-point multiphoton microscopy technology or commercial multiphoton fluorescence microscopy imaging technology, e.g., the FVMPE-RS system of Olympus Corp., Bergamo-II series of Thorlabs Corp., etc. The CM technology can be applied to a laser scanning confocal spectral imaging system, a spinning-disk confocal microscope system, a programmable array microscope system or a commercial CM system, e.g., Zeiss LSM800® of Zeiss Corp., LEXT-OLS4100 of Olympus Corp., etc.

It should be mentioned herein that the embodiments of the present disclosure are not limited to the high-precision nondestructive imaging technology described above, instead, all of the three-dimensional high-precision nondestructive imaging technologies with certain imaging depth should fall within the protection scope.

Optionally, the printhead mentioned above is installed on the printhead mounting arm, there may be a plurality of printheads installed on the printhead mounting arm, and suitable printheads are used according to needs. It can be understood that the printheads installed on the printhead mounting arm form a printhead library. In practice, the sample detection probe included in the monitoring assembly can also be mounted in the printhead library as a kind of printhead of the printer, and when monitoring is required, the printer needs to change the printhead, i.e. replace the printhead with the sample detection probe.

The environment control apparatus comprises an environment control component, wherein the environment control component comprises an environment control module 110 and a sterile operation desk 120. The environment control module 110 has the function of controlling the parameters such as temperature, humidity, carbon dioxide concentration and air cleanliness, and also has the functions of air filtration, control of particle content in air, ultraviolet sterilization and ozone sterilization.

Referring to FIG. 1-2, longitudinal-depth segmented scanning on a printed object is performed by the sample detection probe, in this embodiment, the component constituting the sample detection probe can be a monitoring assembly comprising a high-precision nondestructive monitoring module 310, a machine vision module 320 and an environment monitoring module 330, which achieves, in cooperation with the X/Y/Z axial movement of the printhead mounting arm of the parameter-controllable three-dimensional printing apparatus, the scanning of a set imaging depth; the support exceeding the set transverse scanning range performs scanning in a checkerboard-type detection mode or other detection modes facilitating image splicing, in cooperation with the X/Y-axial movement of the forming platform 210 of the parameter-controllable three-dimensional printing apparatus or the printhead mounting arm installed on the printing movement module 230, to achieve scanning of a set transverse scanning area S, i.e., the detection system first detects a certain region S1 of the model, and then moves, by the forming platform 210 or the printhead mounting arm installed on the printing movement module 230, to another region S2 adjacent to the certain region S1 for detection, the detection proceeds in a similar fashion until a single detection is completed; based on this, the PC 1 achieves, through the longitudinal splicing algorithm, splicing and longitudinal superimposition of the images obtained by the multiple scans to complete the reconstruction of the three-dimensional high-resolution global image. The sample detection probe moves, in cooperation with the print platform or the printhead mounting arm, along the X axis/Y axis/Z axis, to complete one transverse area scanning and one longitudinal-depth scanning, and at the moment, the sample detection probe completes one detection, the printhead continues printing, and when a certain printing thickness is reached, detection is performed again, the processes are repeated until the printing is completed; after completion, the PC reconstructs the detected data into a three-dimensional high-resolution global image, thereby achieving full-longitudinal-depth imaging. For each detection mentioned in the present embodiment, a certain printing thickness needs to be reached, and the specific thickness is not limited in the present embodiment, which can be the thickness reached by each printing (i.e., every time one printing is completed, the next-time detection is carried out), or can be a certain preset printing thickness reached by a preset number of printings (then the next-time detection is carried out).

Figure 9:
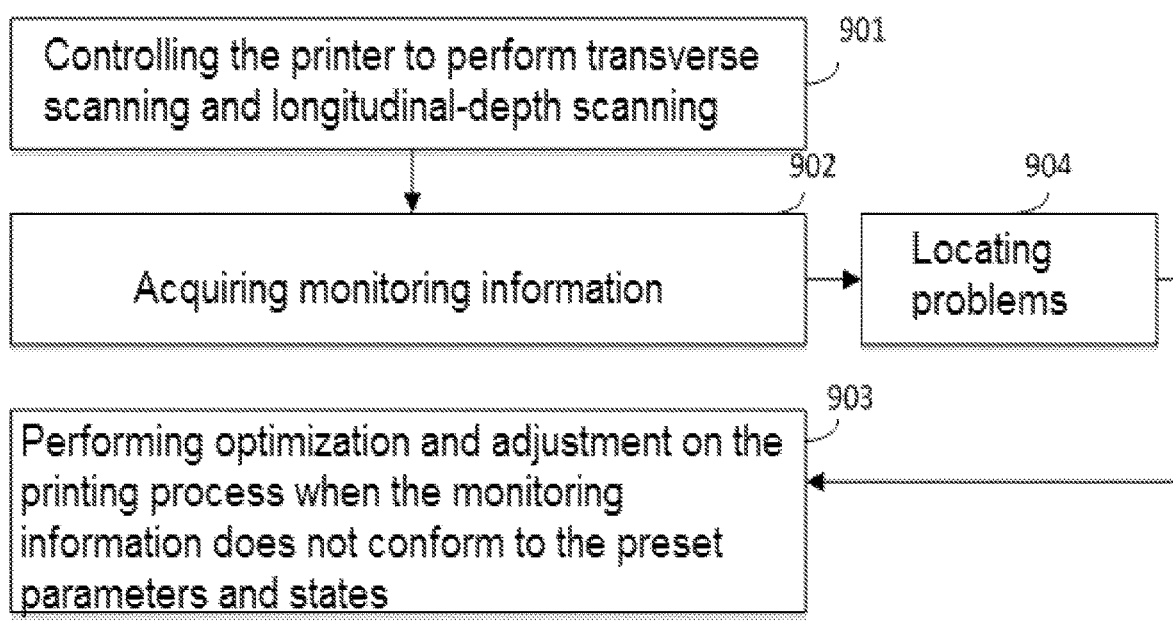
FIG. 9 is a schematic flow chart of a three-dimensional printing on-line monitoring method according to embodiments of the present disclosure.

Referring to FIG. 9, a three-dimensional printing on-line monitoring method is realized using the above described three-dimensional printing apparatus, which method can be controlled and executed by a PC.

The method comprises:

Step 901, controlling the three-dimensional printer to perform transverse scanning and longitudinal-depth scanning on the currently printed body of a printed object, wherein the printed object is segmented according to an imaging depth H of the three-dimensional high-precision nondestructive imaging host and a effective imaging depth h of the printed object, and each longitudinal-depth scanning comprises scanning one segment in longitudinal depth;

Step 902, acquiring monitoring information of the printer in the process of printing a product, the monitoring information comprising printing process control parameters and internal and external structural form information of the printed product; and comparing the monitoring information with the corresponding preset parameters and states of the printed object; and Step 903, adjusting, when the monitoring information does not conform to the preset parameters and states, the current printing process control parameters according to the preset parameters and states, such that the current printing process conforms to the preset parameters and states.

In practice, the monitoring information can include relevant parameter and state information such as real-time printing state of the printing material, forming structure of the surface of the current layer of the printed sample, high-precision internal structural form, deformation of the material after layer superimposition and the error caused thereby, printing defects such as drooling and filament breaking and so on, and the changes of the parameters of the internal environment of the printer. The monitoring information is fed back to the PC controller for processing.

In order to find the problem in time when the monitored information does not conform to the preset parameters and states, after Step 902, the method can further comprise:

Step 904, determining a reason for occurrence of nonconformance to the preset parameters and states in the printing process, according to the target monitoring information that does not conform to the preset parameters and states.

The problems located include, but are not limited to, the problems of printing quality of the printed object, the problems of the printing material and the problems of the printing environment. The problems concerning quality include: filament breaking, hole fusion, channel collapse, drooling, inaccurate structural positioning, deviation of the three-dimensional size of the sample from the design, etc. Step 904 can be executed after Step 902, or before Step 903, which is not limited in the embodiment of the present disclosure.

The problems of the material of the printed object include: the storage condition, extrusion condition and forming condition of the printing material, and whether they are matched with the function parameter setting of the printhead having the self-defined partitioned-area temperature control.

The problems of the environment include: the temperature, humidity, carbon dioxide concentration, air cleanliness degree and the like of the printing.

Furthermore, an embodiment of the present disclosure can further comprise:

acquiring scanning images of each transverse scanning and each longitudinal-depth scanning, until the printing is finished; and splicing and longitudinally superimposing all the acquired scanning images to obtain a three-dimensional high-resolution global image of the printed object.

It should be noted that, as to the specific time for splicing, it is feasible to conduct an image splicing after obtaining the results of every two adjacent scans, or conduct a splicing after the completion of scanning of the printed object; and as to the steps for splicing, it is feasible to first conduct transverse splicing and then conduct longitudinal superimposition, or first conduct longitudinal superimposition and then conduct transverse splicing. The specific time sequence and steps of splicing are not limited in the embodiments of the present disclosure.

The detailed splicing process has been described in the above embodiments with reference to FIG. 4, and is not described herein.

Embodiment 6

In consideration of the situation that in the prior art, the printing quality of a three-dimensional printer in use is observed mostly by an operator, i.e. it requires a person to determine which printing outcomes are unqualified and which printing outcomes are qualified, resulting in a poor quality of the product printed by the three-dimensional printer, embodiments of the present disclosure provide a three-dimensional printing real-time monitoring method and apparatus.

In order to facilitate understanding of this embodiments, first, a three-dimensional printing real-time monitoring method disclosed in an embodiment of the present disclosure is described in detail with embodiments below.

Embodiment 6-1

Referring to the frame diagram of a three-dimensional printing real-time monitoring method shown in FIG. 5-2, and referring to FIG. 7-2, the method can be executed on a processing control module of a printer, and comprises the following steps:

inputting modeling parameters (i.e., printing hierarchical path parameters) for determining a to-be-printed three-dimensional model into the processing control module of the printer, wherein the modeling parameters may be directly generated in the processing control module, or the modeling parameters may be input;

setting preset parameters in the processing control module of the printer, wherein the product printed according to the preset parameters has excellent quality, therefore the preset parameters are used as a standard comparison library, and the preset parameters include environmental parameters, printing parameters and model designing parameters, specifically, the environmental parameters include temperature, humidity, carbon dioxide concentration and air cleanliness of a forming environment; the printing parameters include printing material information, a printhead model and inner and outer diameters of the needle, a printhead temperature, illumination intensity, focusing spot diameter of the laser, power of the laser, exposure time, exposure frequency, filament-discharge pressure, an X/Y-direction printing speed, a Z-direction printing speed, pre-filament-discharge time, later-filament-discharge time, turning delay time, callback time, a layer height, and a filament-discharge interval; the model designing parameters include structural form parameters of each layer, and three-dimensional overall internal and external structure parameters, wherein for these parameters, some are provided with specific determined values, and some are provided with a numerical range, for example, for the printing forming process modeling parameters, the specific advancing track is given, and for the extrusion pressure of the printhead, a numerical range is given; the preset parameters can be set on a cloud server, and the processing control module can communicate with the server to acquire the preset parameters;

starting printing and simultaneously monitoring the printing process control parameters and the quality of the printed product, and collecting the monitoring information for invoking by the processing control module, or collecting the monitoring information and directly transmitting the same to the processing control module, wherein the monitoring information includes forming environmental information, forming parameter and formed structure, specifically, the forming environmental information includes various parameters of the working environment in the working process of the printer, e.g., temperature, humidity, carbon dioxide concentration and air cleanliness of the working environment; the forming parameter includes control parameters of the printer itself in the printing process, e.g., a printhead model and inner and outer diameters of the needle, illumination intensity, focusing spot diameter of the laser, power of the laser, exposure time, exposure frequency, a printhead temperature, filament-discharge pressure, an X/Y-direction printing speed, a Z-direction printing speed, pre-filament-discharge time, later-filament-discharge time, turning delay time, callback time, a layer height, and a filament-discharge interval; the formed structure includes structural form of the currently printed layer and three-dimensional internal and external structure form of a printed body;

the processing control module comparing the monitoring information with the preset parameters, wherein when the monitoring information conforms to the preset parameters, the printing of the current layer is finished, and then if the processing control module judges that the current layer is the end surface, the printing work is completed; and if the processing control module judges that the current layer is not the end surface, then the printing work continues.

When the monitoring information does not conform to the preset parameters, the processing control module performs matching judgment on the monitoring information, and finds out the problems; specifically, the forming environmental information is compared with the environmental parameters to determine whether the monitoring information conforms to the environmental parameters; the forming parameter is compared with the printing parameters to determine whether the forming parameter conforms to the printing parameters; the formed structure is compared with the model designing parameters, including comparison between printing errors of the current layer and three-dimensional internal structure information of the currently printed body, to determine whether the formed structure conforms to the model designing parameters; and in the aforesaid judgement performed by the processing control module, correction is made to the control over the part where the monitored information does not conform to the preset parameters such that it conforms to the preset parameters, then, the printing work continues.

The matching judgment in the printing monitoring process comprises performing judgment on the three-dimensional size, the printing position and the internal structure, the occurrence of filament breaking, etc. of the printed sample; performing judgment on the material problems including whether the printing material is the same as what is set and whether the uniformity of the printing material is good or not; performing judgment on environmental problems including printing temperature, humidity, carbon dioxide concentration, air cleanliness degree and the like, to finally achieve the printing of a sample and at the same time generate quality monitoring reports including a printing environment monitoring report, a printing material quality monitoring report and a printing sample structural form monitoring report. The printing monitoring information includes the functions of environment control of the forming environment, printing parameter control, control of monitoring of forming structural form, etc., and the printing parameter control comprises printing material quality control, enabling adjustment of the uniformity of the printing material; the forming structural form monitoring control function includes current layer and internal structural form monitoring functions in a printing forming process.

Referring to the flow chart of a three-dimensional printing real-time monitoring method shown in FIG. 6-2, the method can be executed on a processing control module of a printer, and comprises the steps of:

Mode I:

S1002: determining a three-dimensional model that needs to be printed, and then inputting modeling parameters of the three-dimensional model into the processing control module.

S1004: setting preset parameters, such as preset forming environment parameters, printing parameters and model designing parameters, in the processing control module according to the determined three-dimensional model. Specifically, the preset parameters vary correspondingly in accordance with different three-dimensional models or different printing materials used by the three-dimensional models. For example, for the printing of an ornamental product and the printing of a loadbearing element, since the ornamental product and the loadbearing element have different requirements on structural mechanical strength, i.e. the ornamental product does not require a great mechanical strength, but the loadbearing element requires a relatively great mechanical strength, the preset parameters set in the processing control module for the printing of the ornamental product are different from those set in the processing control module for the printing of the loadbearing element. Specifically, the printing of the ornamental product and the printing of the loadbearing element are different in the factors such as the printing advancing track and the temperature of the printhead, etc. For another example, for the printing of a biological organ and the printing of an ornamental product, since the printing of a biological organ and the printing of an ornamental product have different requirements on the aspects such as the environment, the material, the hierarchical path and the like, the preset parameters set in the processing control module for the printing of the biological organ are different from those set in the processing control module for the printing of the ornamental product at least by these factors.

S1006: starting the printing operation, monitoring various aspects of the printer in the printing process, and collecting information to form monitoring information. Specifically, in the printing process, the forming environment and forming parameters of the printer and the quality of the printed product (the structural form information of the product) are all monitored, and then the monitoring information is collected and transmitted to the processing control module.

S1008: the processing control module comparing the collected monitoring information with the preset parameters, wherein when the monitoring information conforms to the preset parameters, the processing control module judges whether the layer under printing is an end layer.

S1014: stopping the printing operation, when the processing control module determines that the layer under printing is the end layer (that is, the product is finished).

S1018: the printer sending a prompt signal, and an operator taking out the finished printed product.

Mode II:

S1002: determining a three-dimensional model that needs to be printed, and then inputting modeling parameters of the three-dimensional model into the processing control module.

S1004: setting preset parameters, such as preset forming environment parameters, printing parameters and model designing parameters, in the processing control module according to the determined three-dimensional model.

S1006: starting the printing operation, monitoring various aspects of the printer in the printing process, and collecting information to form monitoring information.

S1008: the processing control module comparing the collected monitoring information with the preset parameters, wherein when the monitoring information conforms to the preset parameters (i.e., the product is qualified), the processing control module judges whether the layer under printing is an end layer.

S1012: continuing the printing operation when the processing control module determines that the layer under printing is not the end layer (that is, the product has not been finished), until the layer under printing is the end layer, completing the printing operation.

S1018: the printer sending a prompt signal, and an operator taking out the finished printed product.

Mode III:

S1002: determining a three-dimensional model that needs to be printed, and then inputting modeling parameters of the three-dimensional model into the processing control module.

S1004: setting preset parameters, such as preset forming environment parameters, printing parameters and model designing parameters, in the processing control module according to the determined three-dimensional model.

S1006: starting the printing operation, monitoring various aspects of the printer in the printing process, and collecting information to form monitoring information.

S1010: the processing control module comparing the collected monitoring information with the preset parameters, and the processing control module controlling, when the monitoring information does not conform to the preset parameters (that is, the product is unqualified), the printer to stop working.

S1016: the processing control module analyzing and comparing the monitoring information, and then correcting and optimizing the control parameters of the printer, and continuing the printing operation until the printed product is qualified.

S1018: the printer sending a prompt signal, and an operator taking out the finished printed product.

Embodiment 6-2

In order to facilitate understanding of the three-dimensional printing real-time on-line monitoring method provided by the above embodiment, an embodiment of the present disclosure provides a three-dimensional printing real-time on-line monitoring apparatus, referring to the three-dimensional printing real-time on-line monitoring apparatus shown in FIG. 1-2 and FIG. 7-2, this apparatus comprising:

an environment control component 100 for controlling and adjusting the working environment of a printer; a printing assembly 200 provided in the environment control component 100 and used for executing the printing of a product according to modeling parameters stored in the printer; a monitoring assembly 300 provided in the printing assembly 200 and used for acquiring monitoring information of a printing process; a processing control module 400 for storing preset parameters, storing the modeling parameters, receiving the monitoring information, performing comparison and analysis on the monitoring information and the preset parameters, and controlling the environment control component 100 and the printing assembly 200 and/or performing optimization and correction on the modeling parameters when the monitoring information does not conform to the preset parameters, so that the printed product conforms to the preset parameters.

In order to enable an operator to accurately acquire the printing condition of the printer, a display 410 can be provided, and a user can view the information such as the key data and the printing progress and the like on the display 410.

A control host of the processing control module is equipped with control software and a printing material standard infrared spectrum library, wherein the control software controls the operation of various functional modules of a three-dimensional printing apparatus, performing corresponding judgment on the monitoring data, and performing corresponding adjustment; and the standard infrared spectrum library is used for the comparison with the spectrums of the printing material collected by the high-precision nondestructive monitoring module, so as to monitor the conditions of matching and uniformity state of the printing material.

The preset parameters include three function setting, i.e., environmental parameters, printing parameters and model designing parameters, which provide data for a monitoring report. The printing parameters include monitoring of the printing material, and monitoring of parameters such as a printhead model and inner and outer diameters of the needle, illumination intensity, focusing spot diameter of the laser, power of the laser, exposure time, exposure frequency, a printhead temperature, filament-discharge pressure, an X/Y-direction printing speed, a Z-direction printing speed, pre-filament-discharge time, later-filament-discharge time, turning delay time, callback time, a layer height, and a filament-discharge interval. The infrared spectrum information of the printing material required can be acquired through the FTIR spectrum of the high-precision nondestructive monitoring module, and then stored in the infrared spectrum library of the processing control module, so as to facilitate real-time monitoring of the printing material in the printing process. The formed structure includes structural form of the currently printed layer and three-dimensional internal and external structure form of a printed body.

In practice, the environment control component 100 comprises an environment control module 110 and a sterile operation desk 120, the environment control module 110 is connected with the processing control module 400; the environment control module 110 can regulate and control the temperature, humidity and carbon dioxide concentration in the working environment of the printer; moreover, the environment control module 110 is further provided with an air filtering device for controlling the particle content in the air and achieving ultraviolet sterilization and/or ozone sterilization; and the sterile operation desk 120 is used for bearing the printing assembly 200, and providing, in cooperation with the environment control module 110, an environment parameter-controllable, sterile and dust-free operation environment for the three-dimensional printing apparatus.

In practice, the printing assembly 200 comprises: a forming platform 210 connected with the environment control component 100 and used for bearing a printed product and capable of adjusting its own temperature; a printing operation module 220 that is used for printing a product and is capable of replacing the printhead type thereof and adjusting the forming parameter setting of the printhead and the printing assembly; a printing movement module 230 for driving the printing operation module 220 to move in the three directions of X, Y and Z in the environment control component 100; and a printing control module 240 connected with the processing control module 400 and used for controlling the forming platform 210, the printing operation module 220 and the printing movement module 230 to complete the printing work.

In practice, the monitoring assembly 300 comprises: a high-precision nondestructive monitoring module 310 for monitoring spectral information of a printing material and three-dimensional internal and external structural forms of a printed product; a machine vision module 320 for monitoring the product printing forming process and the current layer information of the printed product; an environment monitoring module 330 for monitoring the printing working environment; a monitoring control module 340 connected with the processing control module 400 and used for collecting information acquired by monitoring of the high-precision nondestructive monitoring module 310, the machine vision module 320 and/or the environment monitoring module 330 to form monitoring information and uploading the monitoring information to the processing control module 400.

The detection component and the camera of the high-precision nondestructive monitoring module are simultaneously installed within the monitoring probe, and cooperate with each other through a coaxial system without interfering with each other. The machine vision apparatus based on high-definition image acquisition has the function of high-definition image acquisition, and is capable of rapidly recognizing the profile and position information of the sample by utilizing a specific image recognition algorithm, which assists the nondestructive detection apparatus in rapid positioning and determining the scanning position. Moreover, the OCT nondestructive detection apparatus has the advantages of large penetration depth, high detection precision, being nondestructive to the sample due to non-contact, etc., and can achieve the sample internal structural data acquisition. The FTIR nondestructive detector head accomplishes the printing material infrared spectrum acquisition function.

In practice, the monitoring assembly 300 comprises a nondestructive monitoring apparatus based on OCT and FTIR, a machine vision apparatus based on high-definition image acquisition and an environment monitoring module 330 based on distributed sensors; and the processing control module 400 pre-stores a standard infrared spectrum library for the comparison with the spectrum of the printing material collected by the nondestructive monitoring apparatus, and monitors the matching and state conditions of the printing material.

Using the above method, it is possible to achieve monitoring on the printing material, the printed sample and the internal environment of the printer while performing printing, by combination of the parameter-controllable printing assembly 200, the environment monitoring module 330, the high-precision nondestructive monitoring module 310 and the processing control module 400, and under the control of the processing control module, i.e., it is possible to monitor in real time the condition of the replacement of the printing material, and the forming structure of the surface of the layer under printing of the printed sample, give a prompt of printing defects such as drooling and filament breaking, etc., and monitor the high-precision internal structural form deviation, the deformation of the material after layer superimposition and the error caused thereby, and the changes of the parameters of the internal environment of the printer, such kind of information is fed back to the processing control module in real time for processing, so as to judge the current printing state, distinguish the problems, adjust the printing parameters in real time, and optimize the printing quality.

In conclusion, by integrating a three-dimensional high-precision nondestructive imaging system into a three-dimensional printing device, the three-dimensional printing on-line monitoring method and system provided by the embodiments of the present disclosure incorporate the multi-field-of-view collaborative visual images with each other to achieve rapid positioning of transverse range of monitoring in a printing process, achieve full-longitudinal-depth imaging monitoring of the whole printing process by longitudinal-depth segmented imaging of the printing solidified layer and based on longitudinal automatic splicing algorithm, acquire the high-precision internal structural information of the whole printed product, and at the same time, can achieve printing parameter optimization and control of the longitudinal-depth segments by using the longitudinal-depth segmented imaging results, so as to achieve on-line synchronous monitoring of printing and micro-tomography, which effectively solves the problems concerning imaging depth and imaging range of the three-dimensional printing on-line monitoring, and also solves the problem that it is difficult to balance large field-of-view and high precision.

When implemented in the form of software functional units and sold or used as independent products, the functions can be stored in a computer readable storage medium. Based on such understanding, the substance of the technical solution of the present disclosure, the part of the technical solution of the present disclosure that makes contributions to the prior art, or part of the technical solution can be embodied in the form of a software product, and the computer software product is stored in a storage medium, comprising some instructions for enabling one computer device (which can be a personal computer, a server, a network device or the like) to execute all or some of the steps of the methods in the embodiments of the present disclosure. The storage medium includes various mediums capable of storing program codes, such as a USB flash disk, a mobile hard disk, a read-only memory (ROM), a random access memory (RAM), a magnetic disk, or an optical disk.

Finally, it should be noted that the above embodiments are merely specific implementation modes of the present disclosure, and are used to illustrate the technical solutions of the present disclosure, rather than limiting the same, and the protection scope of the present disclosure is not limited thereto. Although the present disclosure has been described in detail with reference to the foregoing embodiments, it should be understood by those of ordinary skills in the art that those who are skilled in this technology may still make modifications to or readily conceive of variations of the technical solutions described in the foregoing embodiments, or make equivalent substitution to some of the technical features therein, within the technical scope disclosed in the present disclosure; and these modifications, variations or substitutions would not cause the substance of the corresponding technical solutions to depart from the spirit and scope of the technical solutions of the embodiments of the present disclosure, and shall be covered by the protection scope of the present disclosure. Therefore, the protection scope of the present disclosure shall be determined by the protection scope of the appended claims.

The descriptions above are only preferred embodiments of the present disclosure, which are not used to limit the present disclosure. Any modifications, equivalent substitutions, improvements etc. within the spirit and principle of the present disclosure shall all be included in the protection scope of the present disclosure.

INDUSTRIAL APPLICABILITY

The three-dimensional printing on-line monitoring method and system provided by the embodiments of the present disclosure are capable of real-time monitoring the printing quality of the parameter-controllable printer in the printing process, and adjusting and optimizing the printing process control of the printer through the information obtained by monitoring, which improves, to a great extent, printing quality conformity and technological controllability.

We claim:

1. A three-dimensional printing on-line monitoring method, using a printing parameter-controllable three-dimensional printing device and a three-dimensional high-precision nondestructive imaging system, wherein the printing parameter-controllable three-dimensional printing device comprises a personal computer (PC), a central control module, a print platform, printhead(s), an X/Y/Z three-axis mobile module and a printhead mounting arm, and the three-dimensional high-precision nondestructive imaging system comprises a three-dimensional high-precision nondestructive imaging host and a sample detection probe;

wherein the three-dimensional printing on-line monitoring method comprises:

Step 1: integrating the three-dimensional high-precision nondestructive imaging system into the printing parameter-controllable three-dimensional printing device to real-time on-line monitor three-dimensional printing and incorporate multi-field-of-view collaborative visual images with each other, to achieve rapid positioning of transverse range for monitoring in a printing process;

Step 2: achieving full-longitudinal-depth imaging monitoring of the whole printing process by longitudinal-depth segmented scanning of a printing solidified layer, based on a longitudinal automatic splicing algorithm, and guiding printing parameter optimization and control of a next depth-increased segment by using in real time a result feedback of the longitudinal-depth segmented scanning, so as to perform synchronous micro-tomography imaging on-line monitoring of the printing; and Step 3: acquiring a three-dimensional high-resolution global image of an internal structure of a printed product, when completing manufacturing of the printed product wherein the Step 2 comprises:

the PC controlling the three-dimensional printing device to perform a transverse scanning and a longitudinal-depth segmented scanning on a currently printed body, wherein a printed object is segmented according to an imaging depth H of the three-dimensional high-precision nondestructive imaging host and an effective imaging depth h of the printed object, and one segment is scanned in each longitudinal-depth scanning;

acquiring in real time monitoring information of the printed object in a current printing process; and optimizing in real time printing process control through the monitoring information.

2. The three-dimensional printing on-line monitoring method according to claim 1, further comprising:

acquiring scanning images in each transverse scanning and each longitudinal-depth segmented scanning in a printing monitoring process, until the printing is completed;

splicing and longitudinally superimposing all the acquired scanning images to obtain a three-dimensional high-resolution global image of the printed object; and storing the obtained three-dimensional high-resolution global image of the printed object.

3. The three-dimensional printing on-line monitoring method according to claim 1, wherein the longitudinal-depth segmented scanning comprises: the sample detection probe cooperating with Z-axial movement of the print platform or the printhead mounting arm of the three-dimensional printing device to achieve scanning of a set imaging depth;

a support exceeding a set transverse scanning range cooperates with X/Y-axial movement of the print platform or the printhead mounting arm of the three-dimensional printing device to perform scanning in a checkerboard-type detection mode or other detection modes facilitating image splicing so as to achieve scanning of a set transverse scanning area; and the PC achieves, through a longitudinal splicing algorithm, splicing and longitudinal superimposition of images obtained by multiple scanning to complete reconstruction of a three-dimensional high-resolution global image of the entire printed product.

4. The three-dimensional printing on-line monitoring method according to claim 2, wherein the sample detection probe cooperates with X/Y-axial movement or Z-axial movement of the print platform or the printhead mounting arm; and when the movement cannot meet a transverse scanning requirement, a three-axis movement module or a six-degree-of-freedom mechanical arm is added.

5. The three-dimensional printing on-line monitoring method according to claim 1, wherein the method further comprises:

the PC generating, in a full-longitudinal-depth imaging monitoring process, a printing path and a motion path of a detection probe of the sample detection probe according to set parameters.

6. A three-dimensional printing on-line monitoring system, comprising: a printing parameter-controllable three-dimensional printing device and a three-dimensional high-precision nondestructive imaging system, wherein the printing parameter-controllable three-dimensional printing device comprises a PC, a controller, a print platform, printhead(s), an X/Y/Z three-axis mobile module and a printhead mounting arm, and the three-dimensional high-precision nondestructive imaging system comprises an imaging host and a sample detection probe, wherein the PC performs steps of:

editing and analyzing a three-dimensional support model, editing printing parameters and detection parameters according to requirements, sending a processing instruction, and on-line monitoring in real time a structure of a currently printed body and errors resulting from accumulation and overlaying-adhesion of one or more layers of a printing material;

the controller performs steps of receiving the processing instruction and controlling the printhead(s), the X/Y/Z three-axis mobile module and the printhead mounting arm;

the imaging host which is connected with the PC performs steps of transmitting data and controlling the sample detection probe to complete scanning and imaging; and the sample detection probe is configured in such a way that the sample detection probe moves, in cooperation with the print platform or the printhead mounting arm, along an X axis/Y axis/Z axis, to complete one transverse area scanning and one longitudinal-depth scanning, and at the moment, the sample detection probe completes one detection, the printhead continues printing, and when a certain printing thickness is reached, detection is performed again, which are repeated until the printing is completed; and after completion, the PC reconstructs detected data into a three-dimensional high-resolution global image, thereby achieving full-longitudinal-depth imaging, wherein the printing parameters and the detection parameters edited by the PC comprise: an imaging depth H of the imaging host, an effective imaging depth h, a thickness h0 of a top portion of the effective imaging depth h that cannot be cured within a short time after printing, an initially detected printing thickness h+h0, with h+h0≤H, and a subsequently detected printing thickness h, wherein a value of the effective imaging depth h, a value of the subsequently detected printing thickness h and a value of h in the initially detected printing thickness are same.

7. The three-dimensional printing on-line monitoring system according to claim 6, wherein for the imaging host, one of an optical coherence tomography (OCT) host, a multiphoton microscopy (MPM) host, a second harmonic generation (SHG) host and a confocal microscopy (CM) host, an ultrasound imaging host and a photoacoustic microscopy (PAM) host or a combination of more than one of them is used.

8. The three-dimensional printing on-line monitoring system according to claim 7, wherein the OCT is applied to a time domain OCT system, a swept-source OCT system, a spectral domain OCT system, a full-field OCT system, a fibre-optical OCT system, a free-space OCT system, or variants of such systems; the MPM is two-photon fluorescence microscopy imaging technology, three-photon fluorescence microscopy imaging technology or multi-focal-point multiphoton microscopy technology; and the confocal microscopy technology is applied to a laser scanning confocal spectral imaging system, a spinning disk confocal microscope system or a programmable array microscope system.

9. The three-dimensional printing on-line monitoring system according to claim 6, wherein the sample detection probe performs steps of:

performing a machine vision imaging, performing a micro-tomography detection;

performing a field-of-view monitoring, and performing a small-range high-precision image acquisition.

10. The three-dimensional printing on-line monitoring system according to claim 6, wherein the printhead(s) is/are installed on the printhead mounting arm, the printhead(s) is/are configured to have a partitioned area temperature control function, wherein the printhead(s) is/are each partitioned according to a material of a printed object and different process positions, for temperature adjustment according to partitioned areas, with partitioned areas of the printhead comprising: a storage area, a transition area, an extrusion area and a forming area.

11. The three-dimensional printing on-line monitoring system according to claim 6, wherein the three-dimensional printing device further comprises an environment control apparatus configured for receiving an instruction from the control host to control at least one parameter among printing temperature, humidity, carbon dioxide concentration and air cleanliness.

12. A three-dimensional printing on-line monitoring method, comprising:

acquiring monitoring information of a printer in a printing process, with the monitoring information comprising printing process control parameters and internal and external structural form information of a printed product; and comparing the monitoring information with preset parameters to determine whether the monitoring information conforms to the preset parameters, wherein if yes, a printing operation is continued according to input modeling parameters input into the printer, wherein the modeling parameters are hierarchical path parameters of a model; and if not, a matching judgment is performed on a reason why the monitoring information does not conform to the preset parameters, according to a comparison result between the monitoring information and the preset parameters, then an optimization adjustment is performed on the printing process control, and the printing operation is continued, wherein the three-dimensional printing on-line monitoring method is applied to a three-dimensional printing device comprising a control host that controls the printing device, wherein the method comprises:

controlling the three-dimensional printing device to perform transverse scanning and longitudinal-depth scanning on a currently printed body of a printed object; and acquiring monitoring information of the three-dimensional printing device in a process of printing the printed object, the monitoring information comprising relevant printing control parameters and internal and external structural form information of the printed product in the printing process, the three-dimensional printing device further comprises an imaging host, and the step of performing transverse scanning and longitudinal-depth scanning on a currently printed body of a printed object comprises:

segmenting the printed object according to an imaging depth H of the imaging host and an effective imaging depth h of the printed object, wherein each longitudinal-depth scanning comprises scanning one segment in a longitudinal depth, and scanning images are acquired in each transverse scanning and each longitudinal-depth segmented scanning until printing of the printed object is completed; and splicing and longitudinally superimposing all the acquired scanning images to obtain a three-dimensional high-resolution global image of the printed object.

13. The three-dimensional printing on-line monitoring method according to claim 12, wherein the step of the optimization adjustment comprises correcting the modeling parameters in the printer, correcting a printing material and output of the printer and/or correcting a working environment of the printer.

14. The three-dimensional printing on-line monitoring method according to claim 12, wherein the monitoring information further comprises forming environmental information, forming parameter and formed structure; and the forming environmental information, the forming parameter and the formed structure are collected to form the monitoring information for invoking and comparison matching.

15. The three-dimensional printing on-line monitoring method according to claim 12, wherein the preset parameters comprise environmental parameters, printing parameters and model designing parameters that serve as comparison standards of the monitoring information;

the environmental parameters comprise a temperature, a humidity, a carbon dioxide concentration and air cleanliness of a forming environment;

the printing parameters include printing material information, a printhead model and inner and outer diameters of a needle, illumination intensity, focusing spot diameter of laser, power of the laser, exposure time, exposure frequency, a printhead temperature, a filament-discharge pressure, a X/Y-direction printing speed, a Z-direction printing speed, a pre-filament-discharge time, a later-filament-discharge time, a corner delay time, a callback time, a layer height, and a filament-discharge interval;

and the model designing parameters comprise structural form parameters of each layer, and three-dimensional overall internal and external structure parameters.

16. The three-dimensional printing on-line monitoring method according to claim 12, wherein the method further comprises:

acquiring, in the monitoring information, target monitoring information that does not conform to the preset parameters, and determining a reason for occurrence of nonconformance to the preset parameters in the printing process.

* * * * *